United States Patent
Glass et al.

(10) Patent No.: US 11,182,836 B2
(45) Date of Patent: *Nov. 23, 2021

(54) GIFT CARD ORDERING SYSTEM AND METHOD

(71) Applicant: GIFT CARD IMPRESSIONS, INC., Kansas City, MO (US)

(72) Inventors: Brett R. Glass, Kansas City, KS (US); Nicole E. Glass, Kansas City, MO (US)

(73) Assignee: E2INTERACTIVE, INC., Atlanta, GA (US)

( * ) Notice: Subject to any disclaimer, the term of this patent is extended or adjusted under 35 U.S.C. 154(b) by 46 days.

This patent is subject to a terminal disclaimer.

(21) Appl. No.: 15/727,990

(22) Filed: Oct. 9, 2017

(65) Prior Publication Data

US 2018/0033065 A1    Feb. 1, 2018

Related U.S. Application Data

(60) Continuation of application No. 15/339,477, filed on Oct. 31, 2016, now Pat. No. 9,785,992, which is a
(Continued)

(51) Int. Cl.
*G06Q 30/06* (2012.01)
*G06Q 30/02* (2012.01)
(Continued)

(52) U.S. Cl.
CPC ......... *G06Q 30/0621* (2013.01); *G06Q 30/02* (2013.01); *G06Q 30/0207* (2013.01);
(Continued)

(58) Field of Classification Search
CPC ..... G06Q 30/06; G06Q 30/0601–0643; G06Q 30/0621; G06Q 30/02; G06Q 40/02;
(Continued)

(56) References Cited

U.S. PATENT DOCUMENTS

| 794,417 A | 7/1905 | Maniachi |
|---|---|---|
| 3,288,350 A | 11/1966 | Kushner |

(Continued)

FOREIGN PATENT DOCUMENTS

| EP | 0950968 A4 | 5/2004 |
|---|---|---|
| EP | 1519332 A1 | 3/2005 |

(Continued)

OTHER PUBLICATIONS

Eazel, William, "Paypal intros SMS Payments," http://www.v3co.uk/articles/print/2152694, vnunet.com, Mar. 24, 2006, 1 page.
(Continued)

*Primary Examiner* — William J Allen
(74) *Attorney, Agent, or Firm* — Gregory Murphy

(57) ABSTRACT

A personalized stored value card and teaser presentation creation system includes a server included with instructions to generate a graphical user interface (GUI) on a second computing device, receive user-supplied content including at least one of user-supplied textual, audio, image, or video content, receive stored value card information associated with a merchant of a stored value card and a monetary amount to be associated with the stored value card, and transmit the received user-supplied content to the server. The server then generates a stored value card holder comprising the received user-supplied content, facilitates a financial transaction to acquire a stored value card associated with the received stored value card information, composites a teaser presentation that includes the received user-supplied content by rendering the user-supplied content in one or more pre-defined fields of the teaser presentation, the teaser presentation indicating, to the recipient, that the stored value card holder and the stored value card are to be received, and transmits the teaser presentation along with or prior to the
(Continued)

stored value card holder and the stored value card to a recipient.

18 Claims, 10 Drawing Sheets

Related U.S. Application Data division of application No. 13/940,436, filed on Jul. 12, 2013, now Pat. No. 9,483,786, which is a continuation-in-part of application No. 13/273,220, filed on Oct. 13, 2011, now Pat. No. 9,031,869.

(60) Provisional application No. 61/737,731, filed on Dec. 14, 2012, provisional application No. 61/392,933, filed on Oct. 13, 2010.

(51) Int. Cl.
  *G06Q 40/02* (2012.01)
  *G06Q 50/00* (2012.01)
  *H04L 29/08* (2006.01)
  *G06F 3/0482* (2013.01)

(52) U.S. Cl.
  CPC ......... *G06Q 30/06* (2013.01); *G06Q 30/0641* (2013.01); *G06Q 40/02* (2013.01); *G06Q 50/01* (2013.01); *H04L 67/18* (2013.01); *G06F 3/0482* (2013.01)

(58) Field of Classification Search
  CPC .... G06Q 50/01; G06Q 30/0207; H04L 67/18; G06F 3/0482
  See application file for complete search history.

(56) References Cited

U.S. PATENT DOCUMENTS

| | | |
|---|---|---|
| 4,068,213 A | 1/1978 | Nakamura et al. |
| 4,482,802 A | 11/1984 | Aizawa et al. |
| 4,734,858 A | 3/1988 | Schlafly |
| 4,747,049 A | 5/1988 | Richardson et al. |
| 4,755,940 A | 7/1988 | Brachtl et al. |
| 4,767,917 A | 8/1988 | Ushikubo |
| 4,795,892 A | 1/1989 | Gilmore et al. |
| 4,877,947 A | 10/1989 | Mori |
| 4,900,904 A | 2/1990 | Wright et al. |
| 4,908,521 A | 3/1990 | Boggan et al. |
| 4,943,707 A | 7/1990 | Boggan et al. |
| 5,091,634 A | 2/1992 | Finch et al. |
| 5,117,355 A | 5/1992 | McCarthy |
| 5,202,826 A | 4/1993 | McCarthy |
| 5,255,182 A | 10/1993 | Adams |
| 5,256,863 A | 10/1993 | Ferguson et al. |
| 5,311,424 A | 5/1994 | Mukherjee et al. |
| 5,367,148 A | 11/1994 | Storch et al. |
| 5,375,240 A | 12/1994 | Grundy |
| 5,383,113 A | 1/1995 | Kight et al. |
| 5,384,449 A | 1/1995 | Peirce |
| 5,465,288 A | 11/1995 | Falvey et al. |
| 5,477,038 A | 12/1995 | Levine et al. |
| 5,500,513 A | 3/1996 | Langhans et al. |
| 5,502,765 A | 3/1996 | Ishiguro et al. |
| 5,511,114 A | 4/1996 | Stimson et al. |
| 5,577,109 A | 11/1996 | Stimson et al. |
| 5,581,064 A | 12/1996 | Riley et al. |
| 5,590,038 A | 12/1996 | Pitroda |
| 5,602,377 A | 2/1997 | Beller et al. |
| 5,619,559 A | 4/1997 | Kennedy |
| 5,621,201 A | 4/1997 | Langhans et al. |
| 5,621,787 A | 4/1997 | McKoy et al. |
| 5,644,721 A | 7/1997 | Chung et al. |
| 5,657,389 A | 8/1997 | Houvener |
| 5,671,279 A | 9/1997 | Elgamal |
| 5,679,938 A | 10/1997 | Templeton et al. |
| 5,679,940 A | 10/1997 | Templeton et al. |
| 5,696,909 A | 12/1997 | Wallner |
| 5,699,528 A | 12/1997 | Hogan |
| 5,705,798 A | 1/1998 | Tarbox |
| 5,708,780 A | 1/1998 | Levergood et al. |
| 5,721,768 A | 2/1998 | Stimson et al. |
| 5,721,781 A | 2/1998 | Deo et al. |
| 5,729,693 A | 3/1998 | Holda-Fleck |
| 5,732,136 A | 3/1998 | Murphree et al. |
| 5,734,719 A | 3/1998 | Tsevdos et al. |
| 5,740,915 A | 4/1998 | Williams |
| 5,754,655 A | 5/1998 | Hughes et al. |
| 5,760,381 A | 6/1998 | Stich et al. |
| 5,777,305 A | 7/1998 | Smith et al. |
| 5,799,285 A | 8/1998 | Klingman |
| 5,806,045 A | 9/1998 | Biorge et al. |
| 5,828,740 A | 10/1998 | Khuc et al. |
| 5,844,972 A | 12/1998 | Jagadish et al. |
| 5,850,217 A | 12/1998 | Cole |
| 5,857,175 A | 1/1999 | Day et al. |
| 5,873,072 A | 2/1999 | Kight et al. |
| 5,878,401 A | 3/1999 | Joseph |
| 5,884,271 A | 3/1999 | Pitroda |
| 5,889,270 A | 3/1999 | Haagen et al. |
| 5,889,863 A | 3/1999 | Weber |
| 5,897,625 A | 4/1999 | Gustin et al. |
| 5,903,633 A | 5/1999 | Lorsch |
| 5,903,830 A | 5/1999 | Joao et al. |
| 5,903,874 A | 5/1999 | Leonard et al. |
| 5,907,142 A | 5/1999 | Kelsey |
| 5,909,492 A | 6/1999 | Payne et al. |
| 5,913,210 A | 6/1999 | Call |
| 5,918,213 A | 6/1999 | Bernard et al. |
| 5,930,363 A | 7/1999 | Stanford et al. |
| 5,945,653 A | 8/1999 | Walker et al. |
| 5,950,173 A | 9/1999 | Perkowski |
| 5,953,710 A | 9/1999 | Fleming |
| 5,956,695 A | 9/1999 | Carrithers et al. |
| 5,956,700 A | 9/1999 | Landry |
| 5,968,110 A | 10/1999 | Westrope et al. |
| 5,984,508 A | 11/1999 | Hurley |
| 5,988,509 A | 11/1999 | Taskett |
| 5,991,413 A | 11/1999 | Arditti et al. |
| 5,991,748 A | 11/1999 | Faskett |
| 5,991,749 A | 11/1999 | Morrill, Jr. |
| 5,999,624 A | 12/1999 | Hopkins |
| 6,000,608 A | 12/1999 | Dorf |
| 6,012,049 A | 1/2000 | Kawan |
| 6,018,570 A | 1/2000 | Matison |
| 6,025,780 A | 2/2000 | Bowers et al. |
| 6,029,139 A | 2/2000 | Cunningham et al. |
| 6,029,141 A | 2/2000 | Bezos et al. |
| 6,029,151 A | 2/2000 | Nikander |
| 6,032,135 A | 2/2000 | Molano et al. |
| 6,032,859 A | 3/2000 | Muehlberger et al. |
| 6,039,244 A | 3/2000 | Finsterwald |
| 6,049,778 A | 4/2000 | Walker et al. |
| 6,055,511 A | 4/2000 | Luebbering et al. |
| 6,055,567 A | 4/2000 | Ganesan et al. |
| 6,058,300 A | 5/2000 | Hanson |
| 6,058,382 A | 5/2000 | Kasai et al. |
| 6,062,472 A | 5/2000 | Cheung |
| 6,070,150 A | 5/2000 | Remington et al. |
| 6,085,167 A | 7/2000 | Iguchi |
| 6,085,242 A | 7/2000 | Chandra |
| 6,088,682 A | 7/2000 | Burke |
| 6,092,053 A | 7/2000 | Boesch et al. |
| 6,098,053 A | 8/2000 | Slater |
| 6,105,008 A | 8/2000 | Davis et al. |
| 6,119,164 A | 9/2000 | Basche |
| 6,125,352 A | 9/2000 | Franklin et al. |
| 6,129,276 A | 10/2000 | Jelen et al. |
| 6,134,533 A | 10/2000 | Shell |
| 6,138,106 A | 10/2000 | Walker et al. |
| 6,138,911 A | 10/2000 | Fredregill et al. |
| 6,142,369 A | 11/2000 | Jonstromer |
| 6,148,249 A | 11/2000 | Newman |
| 6,167,387 A | 12/2000 | Lee-Wai-Yin |

(56) References Cited

U.S. PATENT DOCUMENTS

| | | |
|---|---|---|
| 6,169,890 B1 | 1/2001 | Vatanen |
| 6,173,272 B1 | 1/2001 | Thomas et al. |
| 6,175,823 B1 | 1/2001 | Dusen |
| 6,185,545 B1 | 2/2001 | Resnick et al. |
| 6,188,752 B1 | 2/2001 | Lesley |
| 6,219,652 B1 | 4/2001 | Carter et al. |
| 6,222,914 B1 | 4/2001 | McMullin |
| 6,226,364 B1 | 5/2001 | O'Neil |
| 6,240,397 B1 | 5/2001 | Sachs |
| 6,256,690 B1 | 7/2001 | Carper |
| 6,282,566 B1 | 8/2001 | Lee, Jr. et al. |
| 6,285,749 B1 | 9/2001 | Manto |
| 6,289,322 B1 | 9/2001 | Kitchen et al. |
| 6,295,522 B1 | 9/2001 | Boesch |
| 6,304,860 B1 | 10/2001 | Martin, Jr. et al. |
| 6,308,887 B1 | 10/2001 | Korman et al. |
| 6,311,165 B1 | 10/2001 | Coutts et al. |
| 6,311,170 B1 | 10/2001 | Embrey |
| 6,314,171 B1 | 11/2001 | Dowens |
| 6,315,195 B1 | 11/2001 | Ramachandran |
| 6,317,028 B1 | 11/2001 | Valiulis |
| 6,324,525 B1 | 11/2001 | Kramer et al. |
| 6,327,577 B1 | 12/2001 | Garrison et al. |
| 6,330,544 B1 | 12/2001 | Walker et al. |
| 6,332,135 B1 | 12/2001 | Conklin et al. |
| 6,333,976 B2 | 12/2001 | Lesley |
| 6,334,116 B1 | 12/2001 | Ganesan et al. |
| 6,360,254 B1 | 3/2002 | Linden et al. |
| 6,363,362 B1 | 3/2002 | Burfield et al. |
| 6,363,364 B1 | 3/2002 | Nel |
| 6,366,893 B2 | 4/2002 | Hannula et al. |
| 6,375,073 B1 | 4/2002 | Aebi et al. |
| 6,422,462 B1 | 7/2002 | Cohen |
| 6,424,706 B1 | 7/2002 | Katz et al. |
| 6,434,238 B1 | 8/2002 | Chaum et al. |
| 6,442,532 B1 | 8/2002 | Kawan |
| 6,467,684 B2 | 10/2002 | Fite et al. |
| 6,473,500 B1 | 10/2002 | Risafi et al. |
| 6,473,739 B1 | 10/2002 | Showghi et al. |
| 6,494,367 B1 | 12/2002 | Zacharias |
| 6,502,745 B1 | 1/2003 | Stimson et al. |
| 6,507,823 B1 | 1/2003 | Nel |
| 6,529,956 B1 | 3/2003 | Smith et al. |
| 6,536,659 B1 | 3/2003 | Hauser et al. |
| 6,542,933 B1 | 4/2003 | Durst, Jr. et al. |
| 6,550,672 B1 | 4/2003 | Tracy et al. |
| 6,575,361 B1 | 6/2003 | Graves et al. |
| 6,581,827 B2 | 6/2003 | Welton |
| 6,591,098 B1 | 7/2003 | Shieh et al. |
| 6,594,640 B1 | 7/2003 | Postrel |
| 6,594,644 B1 | 7/2003 | Dusen |
| 6,609,113 B1 | 8/2003 | O'Leary et al. |
| 6,615,189 B1 | 9/2003 | Phillips et al. |
| 6,615,190 B1 | 9/2003 | Slater |
| 6,622,015 B1 | 9/2003 | Himmel et al. |
| 6,636,833 B1 | 10/2003 | Flitcroft et al. |
| 6,648,222 B2 | 11/2003 | McDonald et al. |
| 6,651,885 B1 | 11/2003 | Arias |
| 6,659,259 B2 | 12/2003 | Knox et al. |
| 6,678,664 B1 | 1/2004 | Ganesan |
| 6,684,269 B2 | 1/2004 | Wagner |
| 6,705,520 B1 | 3/2004 | Pitroda et al. |
| 6,745,022 B2 | 6/2004 | Knox |
| 6,769,607 B1 | 8/2004 | Pitroda et al. |
| 6,805,289 B2 | 10/2004 | Noriega et al. |
| 6,807,410 B1 | 10/2004 | Pailles et al. |
| 6,819,219 B1 | 11/2004 | Bolle et al. |
| 6,827,260 B2 | 12/2004 | Stoutenburg et al. |
| 6,829,596 B1 | 12/2004 | Frazee |
| 6,836,765 B1 | 12/2004 | Sussman |
| 6,836,962 B2 | 1/2005 | Khandros et al. |
| 6,839,692 B2 | 1/2005 | Carrott et al. |
| 6,839,744 B1 | 1/2005 | Kloba et al. |
| 6,848,613 B2 | 2/2005 | Nielsen et al. |
| 6,856,974 B1 | 2/2005 | Ganesan et al. |
| 6,868,391 B1 | 3/2005 | Hultgren |
| 6,882,984 B1 | 4/2005 | Boyle et al. |
| 6,915,277 B1 | 7/2005 | Manchester et al. |
| 6,918,537 B2 | 7/2005 | Graves et al. |
| 6,925,439 B1 | 8/2005 | Pitroda |
| 6,932,268 B1 | 8/2005 | McCoy et al. |
| 6,934,529 B2 | 8/2005 | Bagoren et al. |
| 6,934,689 B1 | 8/2005 | Ritter et al. |
| 6,941,270 B1 | 9/2005 | Hannula |
| 6,948,063 B1 | 9/2005 | Ganesan et al. |
| 6,961,412 B2 | 11/2005 | Ruckart et al. |
| 6,965,866 B2 | 11/2005 | Klein |
| 6,975,937 B1 | 12/2005 | Kantarjiev et al. |
| 6,988,657 B1 | 1/2006 | Singer et al. |
| 6,993,510 B2 | 1/2006 | Guy et al. |
| 7,014,107 B2 | 3/2006 | Singer et al. |
| 7,016,863 B1 | 3/2006 | Kamakura et al. |
| 7,024,174 B2 | 4/2006 | Nagy et al. |
| 7,024,396 B2 | 4/2006 | Woodward |
| 7,054,842 B2 | 5/2006 | James et al. |
| 7,069,248 B2 | 6/2006 | Huber |
| 7,072,854 B2 | 7/2006 | Loeser |
| 7,072,864 B2 | 7/2006 | Brake, Jr. et al. |
| 7,083,084 B2 | 8/2006 | Graves et al. |
| 7,085,931 B1 | 8/2006 | Smith et al. |
| 7,086,584 B2 | 8/2006 | Stoutenburg et al. |
| 7,093,761 B2 | 8/2006 | Smith et al. |
| 7,117,227 B2 | 10/2006 | Call |
| 7,128,274 B2 | 10/2006 | Kelley et al. |
| 7,130,817 B2 | 10/2006 | Karas et al. |
| 7,131,582 B2 | 11/2006 | Welton |
| 7,143,055 B1 | 11/2006 | Perkowski |
| 7,162,440 B2 | 1/2007 | Koons |
| 7,165,052 B2 | 1/2007 | Diveley et al. |
| 7,182,252 B1 | 2/2007 | Cooper et al. |
| 7,194,438 B2 | 3/2007 | Sovio et al. |
| 7,209,889 B1 | 4/2007 | Whitfield |
| 7,209,890 B1 | 4/2007 | Peon et al. |
| 7,216,092 B1 | 5/2007 | Weber et al. |
| 7,222,101 B2 | 5/2007 | Bishop et al. |
| 7,229,006 B2 | 6/2007 | Babbi et al. |
| 7,229,014 B1 | 6/2007 | Snyder |
| 7,243,839 B2 | 7/2007 | Beck et al. |
| 7,249,054 B2 | 7/2007 | Keil |
| 7,249,097 B2 | 7/2007 | Hutchison et al. |
| 7,269,256 B2 | 9/2007 | Rosen |
| 7,292,998 B2 | 11/2007 | Graves et al. |
| 7,316,350 B2 | 1/2008 | Algiene |
| 7,328,190 B2 | 2/2008 | Smith et al. |
| 7,333,955 B2 | 2/2008 | Graves et al. |
| 7,356,327 B2 | 4/2008 | Cai et al. |
| 7,363,265 B2 | 4/2008 | Horgan |
| 7,370,012 B2 | 5/2008 | Kams et al. |
| 7,376,431 B2 | 5/2008 | Niedermeyer |
| 7,383,226 B2 | 6/2008 | Kight et al. |
| 7,398,248 B2 | 7/2008 | Phillips et al. |
| 7,400,883 B2 | 7/2008 | Rivers et al. |
| 7,415,617 B2 | 8/2008 | Ginter et al. |
| 7,437,328 B2 | 10/2008 | Graves et al. |
| 7,494,417 B2 | 2/2009 | Walker et al. |
| 7,519,543 B2 | 4/2009 | Ota et al. |
| 7,536,349 B1 | 5/2009 | Mik et al. |
| 7,566,000 B2 | 7/2009 | Agostino et al. |
| 7,590,557 B2 | 9/2009 | Harrison et al. |
| 7,631,803 B2 | 12/2009 | Peyret et al. |
| 7,650,308 B2 | 1/2010 | Nguyen et al. |
| 7,702,542 B2 | 4/2010 | Aslanian, Jr. |
| 7,711,598 B2 | 5/2010 | Perkowski |
| 7,725,326 B1 | 5/2010 | Tracy et al. |
| 7,735,724 B2 | 6/2010 | Fujita et al. |
| 7,757,944 B2 | 7/2010 | Cline et al. |
| 7,774,209 B2 | 8/2010 | James et al. |
| 7,840,437 B2 | 11/2010 | Lewis |
| 7,848,948 B2 | 12/2010 | Perkowski et al. |
| 7,866,548 B2 | 1/2011 | Reed et al. |
| 7,904,333 B1 | 3/2011 | Perkowski |
| 7,905,399 B2 | 3/2011 | Barnes et al. |
| 7,917,386 B2 | 3/2011 | Christensen |
| 7,940,333 B2 | 5/2011 | Suzuki |

(56) References Cited

U.S. PATENT DOCUMENTS

| | | |
|---|---|---|
| 7,941,373 B1 | 5/2011 | Chang et al. |
| 7,959,076 B1 | 6/2011 | Hopkins, III |
| 8,046,268 B2 | 10/2011 | Hunt |
| 8,060,413 B2 | 11/2011 | Castell et al. |
| 8,103,520 B2 | 1/2012 | Mueller et al. |
| 8,109,436 B1 | 2/2012 | Hopkins, III |
| 8,195,568 B2 | 6/2012 | Singhal |
| 8,332,323 B2 | 12/2012 | Stals et al. |
| 8,355,982 B2 | 1/2013 | Hazel et al. |
| 8,396,758 B2 | 3/2013 | Paradise et al. |
| 8,509,814 B1 | 8/2013 | Parker |
| 8,577,735 B2 | 11/2013 | Wilen et al. |
| 8,636,203 B1 | 1/2014 | Patterson et al. |
| 8,662,387 B1 | 3/2014 | Geller et al. |
| 8,751,298 B1 | 6/2014 | Giordano et al. |
| 8,768,834 B2 | 7/2014 | Zacarias et al. |
| 9,031,869 B2 * | 5/2015 | Glass ............... G06Q 30/0621 705/26.5 |
| 9,098,190 B2 | 8/2015 | Zhou et al. |
| 9,483,786 B2 * | 11/2016 | Glass ............... G06Q 30/0621 |
| 9,672,687 B2 | 6/2017 | Cage et al. |
| 9,785,992 B2 * | 10/2017 | Glass ............... G06Q 30/0621 |
| 2001/0001321 A1 | 5/2001 | Resnick et al. |
| 2001/0001856 A1 | 5/2001 | Gould et al. |
| 2001/0005840 A1 | 6/2001 | Verkama |
| 2001/0007983 A1 | 7/2001 | Lee |
| 2001/0011248 A1 | 8/2001 | Himmel et al. |
| 2001/0032878 A1 | 10/2001 | Tsiounis et al. |
| 2001/0034707 A1 | 10/2001 | Sakaguchi |
| 2001/0037264 A1 | 11/2001 | Husemann et al. |
| 2001/0042784 A1 | 11/2001 | Fite et al. |
| 2001/0044776 A1 | 11/2001 | Kight et al. |
| 2001/0056410 A1 | 12/2001 | Ishigaki |
| 2002/0002535 A1 | 1/2002 | Kitchen et al. |
| 2002/0010627 A1 | 1/2002 | Lerat |
| 2002/0010677 A1 | 1/2002 | Kitchen et al. |
| 2002/0013768 A1 | 1/2002 | Ganesan |
| 2002/0019809 A1 | 2/2002 | Kitchen et al. |
| 2002/0022472 A1 | 2/2002 | Watler et al. |
| 2002/0046165 A1 | 4/2002 | Kitchen et al. |
| 2002/0046166 A1 | 4/2002 | Kitchen et al. |
| 2002/0046167 A1 | 4/2002 | Kitchen et al. |
| 2002/0046168 A1 | 4/2002 | Kitchen et al. |
| 2002/0049672 A1 | 4/2002 | Kitchen et al. |
| 2002/0052840 A1 | 5/2002 | Kitchen et al. |
| 2002/0052841 A1 | 5/2002 | Guthrie et al. |
| 2002/0060243 A1 | 5/2002 | Janiak et al. |
| 2002/0062249 A1 | 5/2002 | Iannacci |
| 2002/0062282 A1 | 5/2002 | Kight et al. |
| 2002/0065713 A1 | 5/2002 | Awada et al. |
| 2002/0065773 A1 | 5/2002 | Kight et al. |
| 2002/0065774 A1 | 5/2002 | Young et al. |
| 2002/0077076 A1 | 6/2002 | Suryanarayana et al. |
| 2002/0077993 A1 | 6/2002 | Immonen et al. |
| 2002/0088855 A1 | 7/2002 | Hodes |
| 2002/0091573 A1 | 7/2002 | Hodes |
| 2002/0101966 A1 | 8/2002 | Nelson |
| 2002/0107791 A1 | 8/2002 | Nobrega et al. |
| 2002/0111906 A1 | 8/2002 | Garrison et al. |
| 2002/0115424 A1 | 8/2002 | Bagoren et al. |
| 2002/0116329 A1 | 8/2002 | Serbetcioglu et al. |
| 2002/0119767 A1 | 8/2002 | Fieldhouse et al. |
| 2002/0120571 A1 | 8/2002 | Maung et al. |
| 2002/0128968 A1 | 9/2002 | Kitchen et al. |
| 2002/0138450 A1 | 9/2002 | Kremer |
| 2002/0138573 A1 | 9/2002 | Saguy |
| 2002/0152123 A1 | 10/2002 | Giordano et al. |
| 2002/0152160 A1 | 10/2002 | Allen-Rouman et al. |
| 2002/0152179 A1 | 10/2002 | Racov |
| 2002/0153414 A1 | 10/2002 | Stoutenburg et al. |
| 2002/0161631 A1 | 10/2002 | Banerjee et al. |
| 2002/0169713 A1 | 11/2002 | Chang et al. |
| 2002/0178062 A1 | 11/2002 | Wright et al. |
| 2002/0190123 A1 | 12/2002 | Anvekar et al. |
| 2002/0198722 A1 | 12/2002 | Yuschik |
| 2003/0001005 A1 | 1/2003 | Risafi et al. |
| 2003/0004802 A1 | 1/2003 | Callegari |
| 2003/0004891 A1 | 1/2003 | Rensburg et al. |
| 2003/0004894 A1 | 1/2003 | Rowney et al. |
| 2003/0009382 A1 | 1/2003 | D'Arbeloff et al. |
| 2003/0023552 A1 | 1/2003 | Kight et al. |
| 2003/0028481 A1 | 2/2003 | Flitcroft et al. |
| 2003/0033246 A1 | 2/2003 | Slater |
| 2003/0055735 A1 | 3/2003 | Cameron et al. |
| 2003/0055782 A1 | 3/2003 | Slater |
| 2003/0070080 A1 | 4/2003 | Rosen |
| 2003/0074328 A1 | 4/2003 | Schiff et al. |
| 2003/0093366 A1 | 5/2003 | Halper et al. |
| 2003/0105672 A1 | 6/2003 | Epstein et al. |
| 2003/0105688 A1 | 6/2003 | Brown et al. |
| 2003/0115126 A1 | 6/2003 | Pitroda |
| 2003/0121967 A1 | 7/2003 | Goldberg et al. |
| 2003/0126079 A1 | 7/2003 | Roberson et al. |
| 2003/0141358 A1 | 7/2003 | Hudson et al. |
| 2003/0162565 A1 | 8/2003 | Al-Khaja |
| 2003/0163787 A1 | 8/2003 | Hay et al. |
| 2003/0172039 A1 | 9/2003 | Guy et al. |
| 2003/0191711 A1 | 10/2003 | Jamison et al. |
| 2003/0197059 A1 | 10/2003 | Tidball et al. |
| 2003/0200179 A1 | 10/2003 | Kwan |
| 2003/0200184 A1 | 10/2003 | Dominguez et al. |
| 2003/0212601 A1 | 11/2003 | Silva et al. |
| 2003/0218062 A1 | 11/2003 | Noriega et al. |
| 2003/0218066 A1 | 11/2003 | Fernandes et al. |
| 2003/0220884 A1 | 11/2003 | Choi et al. |
| 2003/0226042 A1 | 12/2003 | Fukushima |
| 2003/0229590 A1 | 12/2003 | Byrne et al. |
| 2003/0233317 A1 | 12/2003 | Judd |
| 2003/0233318 A1 | 12/2003 | King et al. |
| 2003/0234819 A1 | 12/2003 | Daly et al. |
| 2003/0236704 A1 | 12/2003 | Antonucci |
| 2004/0009760 A1 | 1/2004 | Laybourn et al. |
| 2004/0010462 A1 | 1/2004 | Moon et al. |
| 2004/0019564 A1 | 1/2004 | Goldthwaite et al. |
| 2004/0019568 A1 | 1/2004 | Moenickheim et al. |
| 2004/0029569 A1 | 2/2004 | Khan et al. |
| 2004/0046035 A1 | 3/2004 | Davila et al. |
| 2004/0049456 A1 | 3/2004 | Dreyer |
| 2004/0049458 A1 | 3/2004 | Kunugi et al. |
| 2004/0054587 A1 | 3/2004 | Dev et al. |
| 2004/0059671 A1 | 3/2004 | Nozaki et al. |
| 2004/0064409 A1 | 4/2004 | Kight et al. |
| 2004/0068446 A1 | 4/2004 | Do et al. |
| 2004/0068448 A1 | 4/2004 | Kim |
| 2004/0078327 A1 | 4/2004 | Frazier et al. |
| 2004/0078332 A1 | 4/2004 | Ferguson et al. |
| 2004/0083170 A1 | 4/2004 | Bam et al. |
| 2004/0083171 A1 | 4/2004 | Kight et al. |
| 2004/0093305 A1 | 5/2004 | Kight et al. |
| 2004/0094624 A1 | 5/2004 | Fernandes et al. |
| 2004/0107170 A1 | 6/2004 | Labrou et al. |
| 2004/0114766 A1 | 6/2004 | Hileman et al. |
| 2004/0117302 A1 | 6/2004 | Weichert et al. |
| 2004/0118914 A1 | 6/2004 | Smith et al. |
| 2004/0128197 A1 | 7/2004 | Bam et al. |
| 2004/0139005 A1 | 7/2004 | Ganesan |
| 2004/0159700 A1 | 8/2004 | Khan et al. |
| 2004/0162058 A1 | 8/2004 | Mottes |
| 2004/0167853 A1 | 8/2004 | Sharma |
| 2004/0181463 A1 | 9/2004 | Goldthwaite et al. |
| 2004/0185881 A1 | 9/2004 | Lee et al. |
| 2004/0199431 A1 | 10/2004 | Ganesan et al. |
| 2004/0199474 A1 | 10/2004 | Ritter |
| 2004/0205023 A1 | 10/2004 | Hafer et al. |
| 2004/0205138 A1 | 10/2004 | Friedman et al. |
| 2004/0210449 A1 | 10/2004 | Breck et al. |
| 2004/0215560 A1 | 10/2004 | Amalraj et al. |
| 2004/0215564 A1 | 10/2004 | Lawlor et al. |
| 2004/0215573 A1 | 10/2004 | Teutenberg et al. |
| 2004/0224660 A1 | 11/2004 | Anderson |
| 2004/0225560 A1 | 11/2004 | Lewis et al. |
| 2004/0230489 A1 | 11/2004 | Goldthwaite et al. |
| 2004/0232225 A1 | 11/2004 | Bishop et al. |
| 2004/0242208 A1 | 12/2004 | Teicher |

(56) References Cited

U.S. PATENT DOCUMENTS

| | | |
|---|---|---|
| 2004/0243490 A1 | 12/2004 | Murto et al. |
| 2004/0249710 A1 | 12/2004 | Smith et al. |
| 2004/0249766 A1 | 12/2004 | Ganesan et al. |
| 2004/0267663 A1 | 12/2004 | Karns et al. |
| 2004/0267664 A1 | 12/2004 | Nam et al. |
| 2004/0267665 A1 | 12/2004 | Nam et al. |
| 2005/0001027 A1 | 1/2005 | Bahar |
| 2005/0015388 A1 | 1/2005 | Dasgupta et al. |
| 2005/0021457 A1 | 1/2005 | Johnson et al. |
| 2005/0027624 A1 | 2/2005 | Cai |
| 2005/0027655 A1 | 2/2005 | Sharma et al. |
| 2005/0033645 A1 | 2/2005 | DuPhily |
| 2005/0051619 A1 | 3/2005 | Graves et al. |
| 2005/0060261 A1 | 3/2005 | Remington et al. |
| 2005/0061872 A1 | 3/2005 | Paschini et al. |
| 2005/0065876 A1 | 3/2005 | Kumar |
| 2005/0071179 A1 | 3/2005 | Peters et al. |
| 2005/0071269 A1 | 3/2005 | Peters |
| 2005/0075958 A1 | 4/2005 | Gonzalez |
| 2005/0075975 A1 | 4/2005 | Rosner et al. |
| 2005/0079863 A1 | 4/2005 | Macaluso |
| 2005/0080634 A1 | 4/2005 | Kanniainen et al. |
| 2005/0080727 A1 | 4/2005 | Postrel |
| 2005/0086164 A1 | 4/2005 | Kim et al. |
| 2005/0086168 A1 | 4/2005 | Alvarez et al. |
| 2005/0096981 A1 | 5/2005 | Shimada |
| 2005/0097038 A1 | 5/2005 | Yu et al. |
| 2005/0103839 A1 | 5/2005 | Hewel |
| 2005/0107068 A1 | 5/2005 | Smith et al. |
| 2005/0109835 A1 | 5/2005 | Jacoby et al. |
| 2005/0116028 A1 | 6/2005 | Cohen et al. |
| 2005/0125343 A1 | 6/2005 | Mendelovich |
| 2005/0125348 A1 | 6/2005 | Fulton et al. |
| 2005/0127169 A1 | 6/2005 | Foss |
| 2005/0137978 A1 | 6/2005 | Ganesan et al. |
| 2005/0143051 A1 | 6/2005 | Park |
| 2005/0154644 A1 | 7/2005 | Deakin et al. |
| 2005/0174975 A1 | 8/2005 | Mgrdechian et al. |
| 2005/0177437 A1 | 8/2005 | Ferrier |
| 2005/0177517 A1 | 8/2005 | Leung et al. |
| 2005/0182714 A1 | 8/2005 | Nel |
| 2005/0182720 A1 | 8/2005 | Willard et al. |
| 2005/0184145 A1 | 8/2005 | Law et al. |
| 2005/0187873 A1 | 8/2005 | Labrou et al. |
| 2005/0199709 A1 | 9/2005 | Linlor |
| 2005/0203835 A1 | 9/2005 | Nhaissi et al. |
| 2005/0203844 A1 | 9/2005 | Ferguson et al. |
| 2005/0209965 A1 | 9/2005 | Ganesan |
| 2005/0222925 A1 | 10/2005 | Jamieson |
| 2005/0222961 A1 | 10/2005 | Staib et al. |
| 2005/0228717 A1 | 10/2005 | Gusler et al. |
| 2005/0247777 A1 | 11/2005 | Pitroda |
| 2005/0259589 A1 | 11/2005 | Rozmovits et al. |
| 2005/0261968 A1 | 11/2005 | Randall et al. |
| 2005/0262017 A1 | 11/2005 | Kawase et al. |
| 2005/0269401 A1 | 12/2005 | Spitzer et al. |
| 2005/0269402 A1 | 12/2005 | Spitzer et al. |
| 2005/0274793 A1 | 12/2005 | Cantini et al. |
| 2006/0000900 A1 | 1/2006 | Fernandes et al. |
| 2006/0004631 A1 | 1/2006 | Roberts et al. |
| 2006/0004656 A1 | 1/2006 | Lee |
| 2006/0006226 A1 | 1/2006 | Fitzgerald et al. |
| 2006/0023856 A1 | 2/2006 | Welton |
| 2006/0026070 A1 | 2/2006 | Sun |
| 2006/0037835 A1 | 2/2006 | Doran et al. |
| 2006/0041470 A1 | 2/2006 | Filho et al. |
| 2006/0053056 A1 | 3/2006 | Alspach-Goss et al. |
| 2006/0058011 A1 | 3/2006 | Vanska et al. |
| 2006/0074767 A1 | 4/2006 | Fortney et al. |
| 2006/0080232 A1 | 4/2006 | Epps |
| 2006/0085310 A1 | 4/2006 | Mylet et al. |
| 2006/0089160 A1 | 4/2006 | Othmer |
| 2006/0089893 A1 | 4/2006 | Joseph et al. |
| 2006/0113376 A1 | 6/2006 | Reed et al. |
| 2006/0116892 A1 | 6/2006 | Grimes et al. |
| 2006/0136334 A1 | 6/2006 | Atkinson et al. |
| 2006/0136901 A1 | 6/2006 | Nichols |
| 2006/0161490 A1 | 7/2006 | Chakiris et al. |
| 2006/0163343 A1 | 7/2006 | Changryeol |
| 2006/0167744 A1 | 7/2006 | Yoo |
| 2006/0206436 A1 | 9/2006 | James et al. |
| 2006/0207856 A1 | 9/2006 | Dean et al. |
| 2006/0235754 A1 | 10/2006 | Walker et al. |
| 2006/0253320 A1 | 11/2006 | Heywood |
| 2006/0255125 A1 | 11/2006 | Jennings et al. |
| 2007/0017976 A1 | 1/2007 | Peyret et al. |
| 2007/0021969 A1 | 1/2007 | Homeier-Beals |
| 2007/0030824 A1 | 2/2007 | Ribaudo et al. |
| 2007/0038577 A1 | 2/2007 | Werner et al. |
| 2007/0043682 A1 | 2/2007 | Drapkin et al. |
| 2007/0055785 A1 | 3/2007 | Stevens |
| 2007/0063024 A1 | 3/2007 | Guillot |
| 2007/0100761 A1 | 5/2007 | Dillon |
| 2007/0108269 A1 | 5/2007 | Benco et al. |
| 2007/0114274 A1 | 5/2007 | Gibbs et al. |
| 2007/0118478 A1 | 5/2007 | Graves et al. |
| 2007/0125838 A1 | 6/2007 | Law et al. |
| 2007/0130085 A1 | 6/2007 | Zhu |
| 2007/0156436 A1 | 7/2007 | Fisher et al. |
| 2007/0162337 A1 | 7/2007 | Hawkins et al. |
| 2007/0175984 A1 | 8/2007 | Khandaker et al. |
| 2007/0192182 A1 | 8/2007 | Monaco et al. |
| 2007/0198347 A1 | 8/2007 | Muldoon |
| 2007/0208618 A1 | 9/2007 | Paintin et al. |
| 2007/0233615 A1 | 10/2007 | Tumminaro |
| 2007/0257767 A1 | 11/2007 | Beeson |
| 2007/0262140 A1 | 11/2007 | Long |
| 2007/0265872 A1 | 11/2007 | Robinson et al. |
| 2007/0284434 A1 | 12/2007 | Fletcher |
| 2008/0006685 A1 | 1/2008 | Rackley, III et al. |
| 2008/0010190 A1 | 1/2008 | Rackley, III et al. |
| 2008/0010191 A1 | 1/2008 | Rackley, III et al. |
| 2008/0010192 A1 | 1/2008 | Rackley, III et al. |
| 2008/0010193 A1 | 1/2008 | Rackley, III et al. |
| 2008/0010196 A1 | 1/2008 | Rackley, III et al. |
| 2008/0010204 A1 | 1/2008 | Rackley, III et al. |
| 2008/0010215 A1 | 1/2008 | Rackley, III et al. |
| 2008/0028395 A1 | 1/2008 | Motta et al. |
| 2008/0033817 A1 | 2/2008 | Billmaier et al. |
| 2008/0040265 A1 | 2/2008 | Rackley, III et al. |
| 2008/0041938 A1 | 2/2008 | Wise |
| 2008/0046366 A1 | 2/2008 | Bemmel et al. |
| 2008/0052164 A1 | 2/2008 | Abifaker |
| 2008/0052169 A1 | 2/2008 | O'Shea et al. |
| 2008/0059318 A1 | 3/2008 | Packes et al. |
| 2008/0070690 A1 | 3/2008 | Luchene et al. |
| 2008/0071620 A1 | 3/2008 | Lowe |
| 2008/0078831 A1 | 4/2008 | Johnson et al. |
| 2008/0091545 A1 | 4/2008 | Jennings et al. |
| 2008/0097844 A1 | 4/2008 | Hsu et al. |
| 2008/0097851 A1 | 4/2008 | Bemmel et al. |
| 2008/0103972 A1 | 5/2008 | Lanc |
| 2008/0114699 A1 | 5/2008 | Yuan et al. |
| 2008/0126145 A1 | 5/2008 | Rackley, III et al. |
| 2008/0133351 A1 | 6/2008 | White et al. |
| 2008/0167015 A1* | 7/2008 | Vishwanathan .. H04M 3/42374 455/413 |
| 2008/0172306 A1 | 7/2008 | Schorr et al. |
| 2008/0172331 A1 | 7/2008 | Graves et al. |
| 2008/0179395 A1 | 7/2008 | Dixon et al. |
| 2008/0189368 A1* | 8/2008 | Rothschild ............... B07C 3/00 709/205 |
| 2008/0228597 A1 | 9/2008 | Sondles |
| 2008/0235095 A1 | 9/2008 | Oles et al. |
| 2008/0255942 A1 | 10/2008 | Craft |
| 2008/0273630 A1 | 11/2008 | Mege et al. |
| 2008/0290987 A1 | 11/2008 | Li |
| 2008/0319868 A1 | 12/2008 | Briscoe et al. |
| 2009/0001159 A1 | 1/2009 | James et al. |
| 2009/0006116 A1 | 1/2009 | Baker et al. |
| 2009/0030789 A1 | 1/2009 | Mashinsky |
| 2009/0037326 A1 | 2/2009 | Chitti et al. |
| 2009/0055296 A1 | 2/2009 | Nelsen |

(56) References Cited

U.S. PATENT DOCUMENTS

| | | |
|---|---|---|
| 2009/0063297 A1* | 3/2009 | Dooley ............... G06Q 20/382 |
| | | 705/64 |
| 2009/0076896 A1 | 3/2009 | DeWitt et al. |
| 2009/0106115 A1 | 4/2009 | James et al. |
| 2009/0111378 A1 | 4/2009 | Sheynman et al. |
| 2009/0112709 A1 | 4/2009 | Barhydt et al. |
| 2009/0144161 A1 | 6/2009 | Fisher |
| 2009/0157554 A1 | 6/2009 | Hobson et al. |
| 2009/0164329 A1 | 6/2009 | Bishop et al. |
| 2009/0171739 A1 | 7/2009 | De et al. |
| 2009/0171804 A1 | 7/2009 | Lee et al. |
| 2009/0173782 A1 | 7/2009 | Muscato |
| 2009/0173784 A1 | 7/2009 | Tang |
| 2009/0187491 A1 | 7/2009 | Bull et al. |
| 2009/0192904 A1 | 7/2009 | Patterson et al. |
| 2009/0192928 A1 | 7/2009 | Abifaker |
| 2009/0247131 A1 | 10/2009 | Champion et al. |
| 2009/0254453 A1 | 10/2009 | Sanguinetti et al. |
| 2009/0281915 A1 | 11/2009 | Deakin et al. |
| 2009/0281941 A1 | 11/2009 | Worth |
| 2009/0281951 A1 | 11/2009 | Shakkarwar |
| 2009/0287558 A1 | 11/2009 | Seth et al. |
| 2009/0298427 A1 | 12/2009 | Wilkinson et al. |
| 2009/0327121 A1 | 12/2009 | Carroll et al. |
| 2010/0005025 A1 | 1/2010 | Kumar et al. |
| 2010/0008535 A1 | 1/2010 | Abulafia et al. |
| 2010/0010906 A1 | 1/2010 | Grecia |
| 2010/0041368 A1 | 2/2010 | Kumar |
| 2010/0042471 A1 | 2/2010 | Chang et al. |
| 2010/0049632 A1* | 2/2010 | Friedman ............... G06Q 30/02 |
| | | 705/26.1 |
| 2010/0063906 A1 | 3/2010 | Nelsen et al. |
| 2010/0076833 A1 | 3/2010 | Nelsen |
| 2010/0082487 A1 | 4/2010 | Nelsen |
| 2010/0082490 A1 | 4/2010 | Rosenblatt et al. |
| 2010/0088188 A1 | 4/2010 | Kumar et al. |
| 2010/0097180 A1 | 4/2010 | Cardullo |
| 2010/0130172 A1 | 5/2010 | Vendrow et al. |
| 2010/0131415 A1 | 5/2010 | Sartipi |
| 2010/0174993 A1 | 7/2010 | Pennington et al. |
| 2010/0175287 A1 | 7/2010 | Gupta et al. |
| 2010/0185505 A1 | 7/2010 | Sprogoe et al. |
| 2010/0205063 A1 | 8/2010 | Mersky |
| 2010/0250372 A1* | 9/2010 | Smith ............... G06Q 20/045 |
| | | 705/14.68 |
| 2010/0280921 A1 | 11/2010 | Stone et al. |
| 2010/0280965 A1* | 11/2010 | Vesterinen ............ G06F 21/6245 |
| | | 705/319 |
| 2010/0293536 A1 | 11/2010 | Nikitin et al. |
| 2010/0299194 A1 | 11/2010 | Snyder et al. |
| 2010/0299266 A1 | 11/2010 | Catania et al. |
| 2010/0304852 A1 | 12/2010 | Szrek et al. |
| 2010/0314276 A1* | 12/2010 | Wilen ............... B42D 5/025 |
| | | 206/459.5 |
| 2011/0087592 A1 | 4/2011 | Veen et al. |
| 2011/0091092 A1 | 4/2011 | Nepomniachtchi et al. |
| 2011/0106698 A1 | 5/2011 | Isaacson et al. |
| 2011/0125607 A1 | 5/2011 | Wilen |
| 2011/0145044 A1 | 6/2011 | Nelsen et al. |
| 2011/0161226 A1 | 6/2011 | Courtion et al. |
| 2011/0173083 A1 | 7/2011 | Reed et al. |
| 2011/0202419 A1 | 8/2011 | Mamdani et al. |
| 2011/0234514 A1 | 9/2011 | Gothard |
| 2011/0246284 A1 | 10/2011 | Chaikin et al. |
| 2011/0251962 A1 | 10/2011 | Hruska |
| 2011/0282942 A1* | 11/2011 | Berger ............... G06Q 10/10 |
| | | 709/204 |
| 2012/0004769 A1 | 1/2012 | Hallenbeck et al. |
| 2012/0099780 A1 | 4/2012 | Smith et al. |
| 2012/0136780 A1 | 5/2012 | El-Awady et al. |
| 2012/0203572 A1 | 8/2012 | Christensen |
| 2012/0209688 A1 | 8/2012 | Lamothe et al. |
| 2012/0234911 A1 | 9/2012 | Yankovich et al. |
| 2012/0271689 A1 | 10/2012 | Etheredge et al. |
| 2012/0276880 A1* | 11/2012 | Angorn ............... H04W 4/12 |
| | | 455/414.1 |
| 2012/0284185 A1 | 11/2012 | Mettler et al. |
| 2013/0073388 A1 | 3/2013 | Heath |
| 2013/0290121 A1 | 10/2013 | Simakov et al. |
| 2013/0304561 A1 | 11/2013 | Warner et al. |
| 2014/0006268 A1 | 1/2014 | Roberts et al. |
| 2014/0019238 A1 | 1/2014 | Blatchley et al. |
| 2015/0278845 A1 | 10/2015 | Sorem et al. |
| 2017/0076293 A1 | 3/2017 | Cage et al. |

FOREIGN PATENT DOCUMENTS

| | | |
|---|---|---|
| EP | 2128809 A1 | 12/2009 |
| JP | 2002189963 A | 7/2002 |
| JP | 2002318951 A | 10/2002 |
| JP | 2003208541 A | 7/2003 |
| KR | 20010106187 A | 11/2001 |
| KR | 20040028487 A | 4/2004 |
| KR | 20040052531 A | 6/2004 |
| KR | 1020040052502 A | 6/2004 |
| KR | 20040069294 A | 8/2004 |
| KR | 20050118609 A | 12/2005 |
| KR | 20090123444 A | 12/2009 |
| WO | 2004012118 A1 | 2/2004 |
| WO | 2005111882 A1 | 11/2005 |
| WO | 2008005018 A9 | 1/2010 |
| WO | 2013078499 A1 | 6/2013 |

OTHER PUBLICATIONS

International Search Report of PCT/US 13/23945, Mar. 29, 2013; 2 pages.
ISA European Patent Office, Search Report of EP09812328.4, Jul. 4, 2012, Germany, 6 pages.
ISA Korea, International Search Report of PCT/US2009/056118, Apr. 19, 2010, 3 pages.
ISA Korea, International Search Report of PCT/US2009/058111, May 26, 2010, 3 pages.
ISA Korean Intellectual Property Office, International Search Report of PCT/US2010/060875, Jul. 29, 2011, 10 pages.
ISA United States Patent and Trademark Office, International Search Report of PCT/US2008/073910, Nov. 10, 2008.
Nelsen, David A., "Systems and Methods to Manage and Control Use of a Virtual Card," U.S. Appl. No. 13/158,349, filed Jun. 10, 2011, 62 pages.

* cited by examiner

Fig. 4

Settings

- Sign In
- Need Help?
- Terms of Service

Done

Fig. 5

Sign In

E-mail: _____
Password: _____

Sign In

Fig. 6

Register New Account

"Creating an account will save your billing address for future purchases."

E-mail: _____
Password: _____
Confirm Password: _____

Register

Checkout as Guest

◀ Back      Continue ▶

Fig. 7

Recipient Information

Name: _____
E-mail: _____

Message ▼

◀ Back      Continue ▶

Fig. 8

Recipient Information

- Recipient Location:
- Recipient Age:
- 3 Likes/Interests:
- Naughty? Why?

◀ Back     Continue ▶

Fig. 9

Select an Occasion

| Congratulations |
| --- |
| Birthday |
| Wedding |
| New Baby |
| Back to School |
| Just Because |
| Graduation |
| Holiday |

Fig. 10

Select a Gift Card Holder

◀ Gift Card Holder Design 1 ▶

Tap card to view inside

◀ Back     Continue ▶

Fig. 11

Customize Gift Card Holder

Gift Card Holder Design 1 (exterior cover)

Add photo
- Upload from social media site
- Upload from phone
- Take a picture ◀ Back     Continue ▶

GIFT CARD ORDERING SYSTEM AND METHOD

RELATED APPLICATIONS

This application is a continuation of U.S. patent application Ser. No. 15/339,447, filed Oct. 31, 2016; which is a divisional of U.S. patent application Ser. No. 13/940,436, filed Jul. 12, 2013, now U.S. Pat. No. 9,483,786; which claims priority to U.S. Provisional Patent Application No. 61/737,731, filed Dec. 14, 2012, and is also a continuation-in-part of U.S. patent application Ser. No. 13/273,220, filed Oct. 13, 2011, now U.S. Pat. No. 9,031,869; which claims priority to U.S. Provisional Patent Application No. 61/392,933, filed Oct. 13, 2010, the disclosures of which are incorporated herein by reference in their entirety.

BACKGROUND

This invention relates generally to gift cards and more particularly to a system for improving the overall giftability of gift cards by providing means for users to add numerous personalization options to physical gift card holders as well as the personalization of other digital communications mediums to communicate a sentiment, occasion, message, and/or gift card brand experience. A system according to the invention also includes a computing device of the user that generates a user interface having application program interfaces (APIs) that interface with one or more peripheral devices of the computing device to receive and process user-supplied content.

Transaction cards, stored value cards, or gift cards as they are commonly called based upon their intended use, have become popular gifts. Gift cards typically comprise a stored value card whereby a certain cash equivalent value is encoded upon a magnetic strip applied to the surface of the card. This stored value is determined by the vendor prior to packaging and display for sale or is selected at the point of sale by the purchaser and loaded by the cashier using a magnetic card reader/writer.

Gift card holders for gift cards have been used both to simply store gift cards and to provide a surface for decorative indicia and graphics, as well as personalized or pre-printed text. Gift card holders also includes a sound generating device to provide user initiated sound for its recipient.

What is needed is a system that provides for personalization of gift card holders via an online, interactive ordering platform, whereby a user may select from content provided by the system as well as upload personalized content for inclusion in the production of the holder using a user interface including application program interfaces (APIs) that interface with one or more peripheral devices of a computing device of the user.

SUMMARY

Embodiments of the gift card ordering system and method provides a solution to conventional gift card purchasing systems by incorporating one or more peripheral application program interfaces (APIs) of an application executed on a user's computing device for obtaining user-supplied content for inclusion on a gift card holder/gift card combination to be sent to a recipient. The application is any type of application executable on a computing device of the user, such as code rendered by a web browser or application software (i.e., a mobile app) that is executed by the computing device, which may be, for example, a tablet computer or a wireless communication device.

According to one aspect of the disclosure, a personalized stored value card and teaser presentation creation system includes a server included with instructions to generate a graphical user interface (GUI) on a second computing device, receive user-supplied content including at least one of user-supplied textual, audio, image, or video content, receive stored value card information associated with a merchant of a stored value card and a monetary amount to be associated with the stored value card, and transmit the received user-supplied content to the server. The server then generates a stored value card holder comprising the received user-supplied content, facilitates a financial transaction to acquire a stored value card associated with the received stored value card information, composites a teaser presentation that includes the received user-supplied content by rendering the user-supplied content in one or more predefined fields of the teaser presentation, the teaser presentation indicating, to the recipient, that the stored value card holder and the stored value card are to be received, and transmits the teaser presentation along with or prior to the stored value card holder and the stored value card to a recipient.

BRIEF DESCRIPTION OF THE DRAWINGS

FIG. 4 illustrates an example of a settings page of a user interface according to an aspect of the gift card ordering system.

FIG. 5 illustrates an example of a sign in page of a user interface according to an aspect of the gift card ordering system.

FIG. 6 illustrates an example of a registration page of a user interface according to an aspect of the gift card ordering system.

FIG. 7 illustrates an example of a recipient information entry page of a user interface according to an aspect of the gift card ordering system.

FIG. 8 illustrates an example of a recipient information entry page of a user interface according to an aspect of the gift card ordering system.

FIG. 9 illustrates an example of an occasion selection page of a user interface according to an aspect of the gift card ordering system.

FIG. 10 illustrates an example of a gift card holder selection page of a user interface according to an aspect of the gift card ordering system.

FIG. 11 illustrates an example of a photo selection page of a user interface according to an aspect of the gift card ordering system.

DETAILED DESCRIPTION

Although gift cards have been become a commonly accepted gifting medium, their use has not been without limitation. For example, conventional gift cards are generally impersonal in that they typically do not include any personal sentiment that the user (i.e., sender) would like to convey to his or her recipient. Embodiments of the present disclosure provide a solution to this problem using an application executed on a computing device that obtains content for inclusion on a gift card holder from one or more peripheral devices of the computing device using application program interfaces (APIs) that interface with these devices.

Figure 1A:
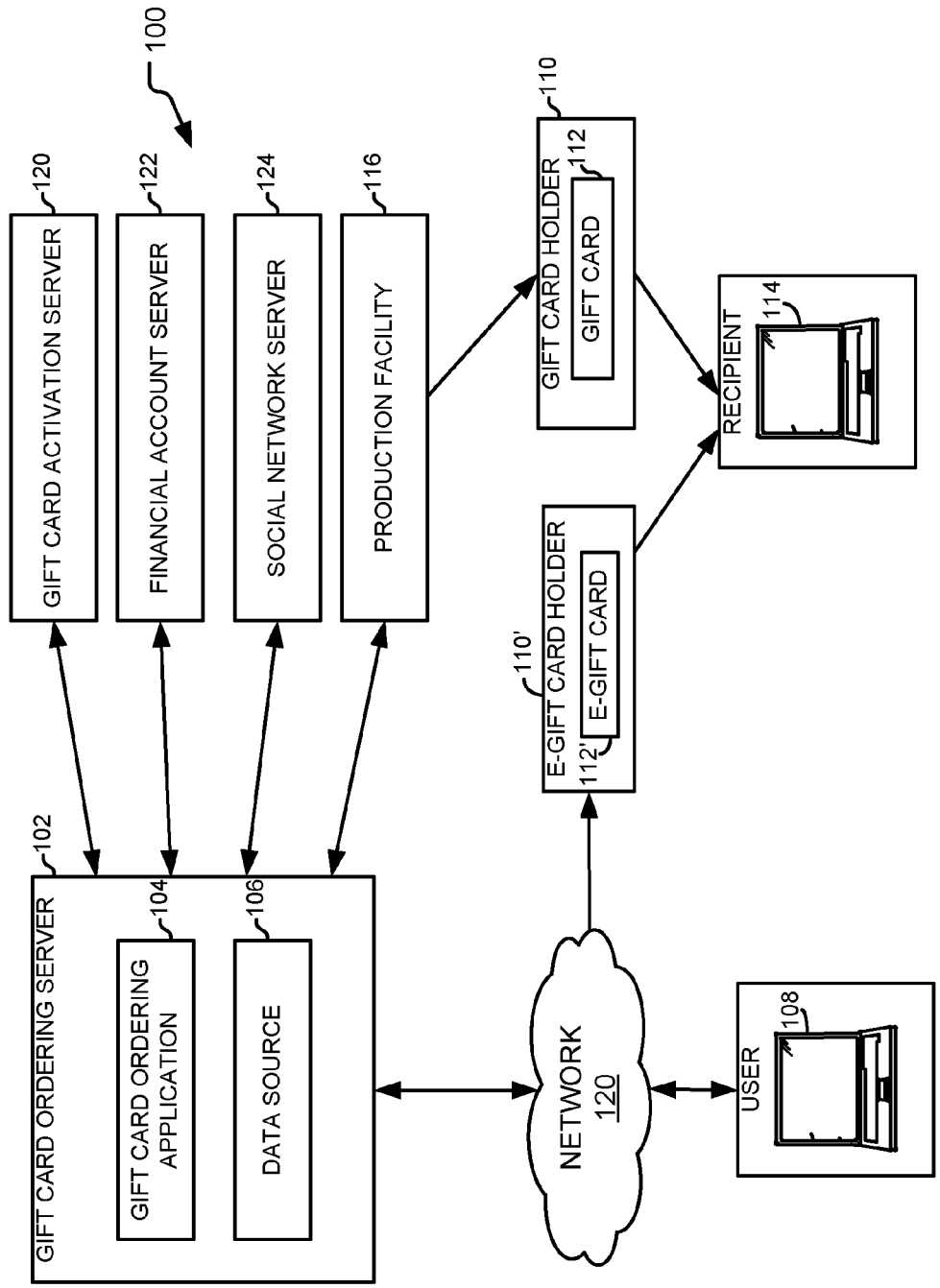
FIG. 1A is a block diagram of a computing system that includes a gift card ordering system according to an aspect of the gift card ordering system.
Figure 1B:
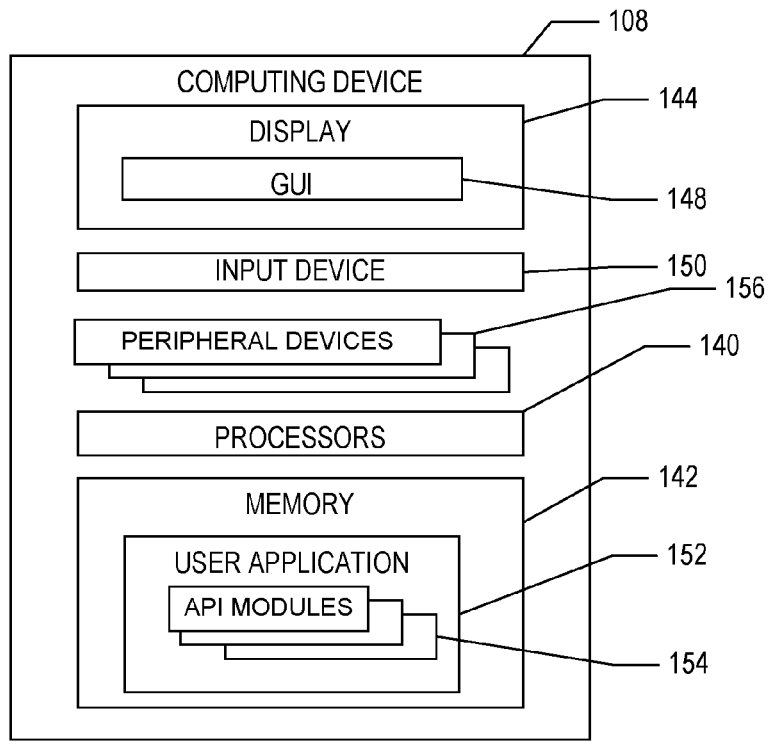
FIG. 1B depicts an exemplary embodiment of a computing device according to one aspect of the gift card ordering system.
Figure 1C:
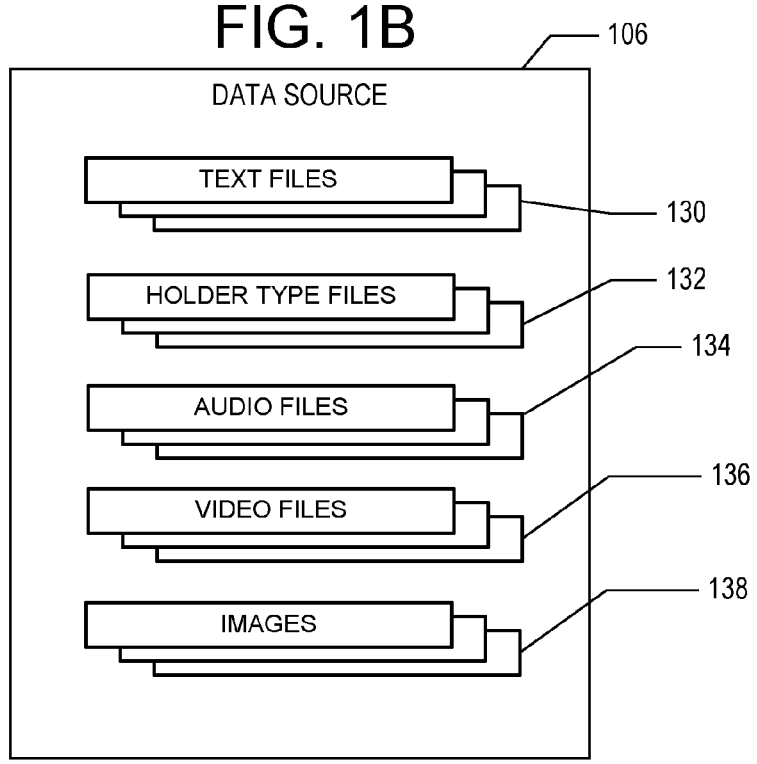
FIG. 1C depicts an exemplary embodiment of a data source according to an aspect of the gift card ordering system.

FIGS. 1A through 1C depict an example gift card ordering system 100 according to aspects of the disclosure. The system 100 includes a gift card ordering server 102 that includes a gift card ordering application 104 and a data source 106. As will be described in detail below, the gift card ordering application 104 receives personalized information from a computing device 108 of a user, and generates a gift card holder 110 that is sent to a recipient along with a selected gift card 112. The gift card holder/gift card combination may be a physical gift card holder 110 that is fabricated by a production facility 116 and a physical gift card 112 and sent to the recipient using a suitable mail delivery service. Alternatively, gift card holder/gift card combination may be a digital gift card holder 110' and digital gift card (e-gift card) 112' that is transmitted to a computing device 114 of the recipient via a messaging service, such as e-mail, a short message service (SMS), or a multimedia message service (MMS), or other suitable digital communication medium.

The server 102 communicates with a website of a retailer, such as a mail order retailer, or processing center of a retailer or other entity that processes incoming orders for products and fulfills these orders by managing shipment of the ordered product to the purchaser or other recipient and payment for the ordered product from the purchaser. The server 102 includes a processing system 202 (FIG. 2) that execute the gift card activation application 104 stored in computer readable media 204 (i.e., volatile and/or non-volatile memory) using the data source 106. Examples of a server 102 include one or more servers, personal computers, mobile computers and/or other mobile devices, and other computing devices. The server 102 may communicate via wireless and/or wireline communications.

The server 102 communicates with a gift card activation server 120 for activation of the gift card, and a financial account server 122 that is associated with a financial account of the user to provide payment for the activated gift card by the user. The financial account is any type, such as a credit card account, a debit card account, a GOOGLE WALLET™ account, or a PAYPAL™ account of the user. Prior to activation of the gift card, the server 102 facilitates a financial transaction between the gift card activation server 120 and the financial account server 122 associated with the user to provide payment for the gift card. The server 102 also communicates with a social network server 124 to obtain information about the user and/or recipient for suggesting additional content to be included with the gift card holder/gift card combination. Additionally, the server 102 communicates with the social network server 124 to obtain information about the user and/or recipient for suggestions regarding events or any special occasions (e.g., birthdays, anniversaries, weddings, expected graduation dates, and the like) associated with the user and/or recipient. For example, the server 102 may obtain information associated with a friend of the user indicating that the friend has an upcoming anniversary, and present this information to the user along with any gift card/gift card holder designs related to anniversaries so that the user can optionally select a particular gift card/gift card holder design to send to the friend (e.g., recipient).

The gift card activation server 120, the financial account server 122, the social network server 124, and the production facility 116 have one or more processors and executable instructions stored in volatile and/or non-volatile memory for performing the actions and/or steps described herein.

The data source 106 stores information that is used by the sender to generate a personalized (e.g., customized) gift card holder. In the particular embodiment shown, the data source 106 stores one or more text files 130, one or more holder type files 132, one or more pre-recorded audio files 134, one or more video files 136, and one or more pre-recorded image files 138 (i.e., photographs). In other embodiments, the data source 106 stores any suitable type of information for personalizing the gift card holder by the user. Although the data source 106 is shown as being located on, at, or within the local server 102, it is contemplated that the data source 106 can be located remotely from the local server 102 in other aspects of the system 100, such as on, at, or within a database of a data management system or a database of another computing device or system having at least one processor and volatile and/or non-volatile memory.

The communication network 120 can be the Internet, an intranet, or another wired and/or wireless communication network. In one aspect, one or more of the server 102 and the computing device 108 communicate with one another using any suitable protocol or messaging scheme. For example, the server 102 and computing device 108 communicates using a Hypertext Transfer Protocol (HTTP), extensible markup language (XML), extensible hypertext markup language (XHTML), or a Wireless Application Protocol (WAP) protocol. Other examples of communication protocols exist. Although the example of FIG. 1A shows the server 102 communicating with the computing device 108 through a network, other embodiments contemplate the server 102 communicating directly with the computing device 108 without the use of a separate and a distinct network. Additionally, other embodiments contemplate that the modules employed by the server 102 and the computing device 108 are integrated in one computing system. Further, the servers 120, 122, 124, and production facility 116 alternatively communicates with the gift card activation server 102 via the network 120.

The gift card ordering application 104 provides a mechanism for generating a gift card holder 110 includes personalized content by uploading one or more photographs, customized text messages such as a greeting, add pre-recorded songs and/or sound or voice messages and include this content with the gift card holder 110. The user accesses the system 100 via the computing device 108 hosted by the gift card ordering server 102 using an HTML link or other suitable entry point, such as through application software (i.e., a mobile app) executed on a portable computing device, such as a wireless communication device. The gift card ordering application 104 then either transmits this information to a production facility 116 where the physical gift card holder 110 is fabricated according to the received information, and subsequently sent along with a selected physical gift card 112 to the recipient, or generates a digital gift card holder 110', digital gift card 112' combination that is digitally transmitted to the recipient using an e-mail message, a short message service (SMS), via a social media account, or other suitable digital communication medium.

FIG. 1B depicts an example embodiment of a computing device 108 according to one aspect of the gift card ordering system 100. The computing device 108 is a computing or processing device that includes one or more processors 140 and memory 142. For example, the computing device 108 can be a personal computer, such as a laptop or notebook computer, a workstation, or other processing device such as a personal digital assistant or a tablet computer. The computing device 108 includes a display 144, such as a computer monitor, for displaying data and/or a graphical user interface 148. The computing device 108 also includes an input device 150, such as a keyboard or a pointing device (e.g., a mouse, trackball, pen, or touch screen) to enter data into or interact with the graphical user interface 148. In one embodiment, the display 144 comprises a touch-screen device in which input is provided via contact by the user with the touch-screen device. The computing device 108 receives data and/or communications from, and/or transmit data and/or communications to, the server 102 via the communication network 120.

The computing device 108 includes a user application 152 stored in the memory 142 and executed on the processors 140 to generate the graphical user interface (GUI) 148 to the display 104. The graphical user interface 148 enables the computing device 108 of the user to interact with one or more data entry forms received from the server 102 to enter order detail data and submit orders to the application 104. In one embodiment, the user application 152 includes a web browser that displays interactive web pages, applets, or other suitable user interface mechanisms including one or more selectable fields, editing screens, and the like for selecting content and/or modifying pre-recorded content by the user (i.e., sender). In another embodiment, the GUI application 152 includes application software (i.e., a mobile app) that is executed on the computing device 108, which is, for example, a wireless communication device for providing one or more selectable fields, edit screens, and the like for selecting content and/or modifying pre-recorded content by the user.

According to an aspect of the present disclosure, the user application 152 also includes one or more application program interface (API) modules 154 for communicating with one or more peripheral devices 156 configured in the computing device 108. The API modules 154 include any type that receives user-supplied content from the user. For example, the API modules 154 include a keyboard for receiving alpha-numeric text information from the user, a microphone for receiving audio content from the user, and/or a camera for receiving photographic or video content from the user. As another example, the user application 152 may expose the API modules 154 for use by one or more other systems, such as such as PAYPAL™, or GOOGLE WALLET™, so that these systems may also communicate with the peripheral devices 156 for receiving user-supplied content from the computing device.

Figure 2:
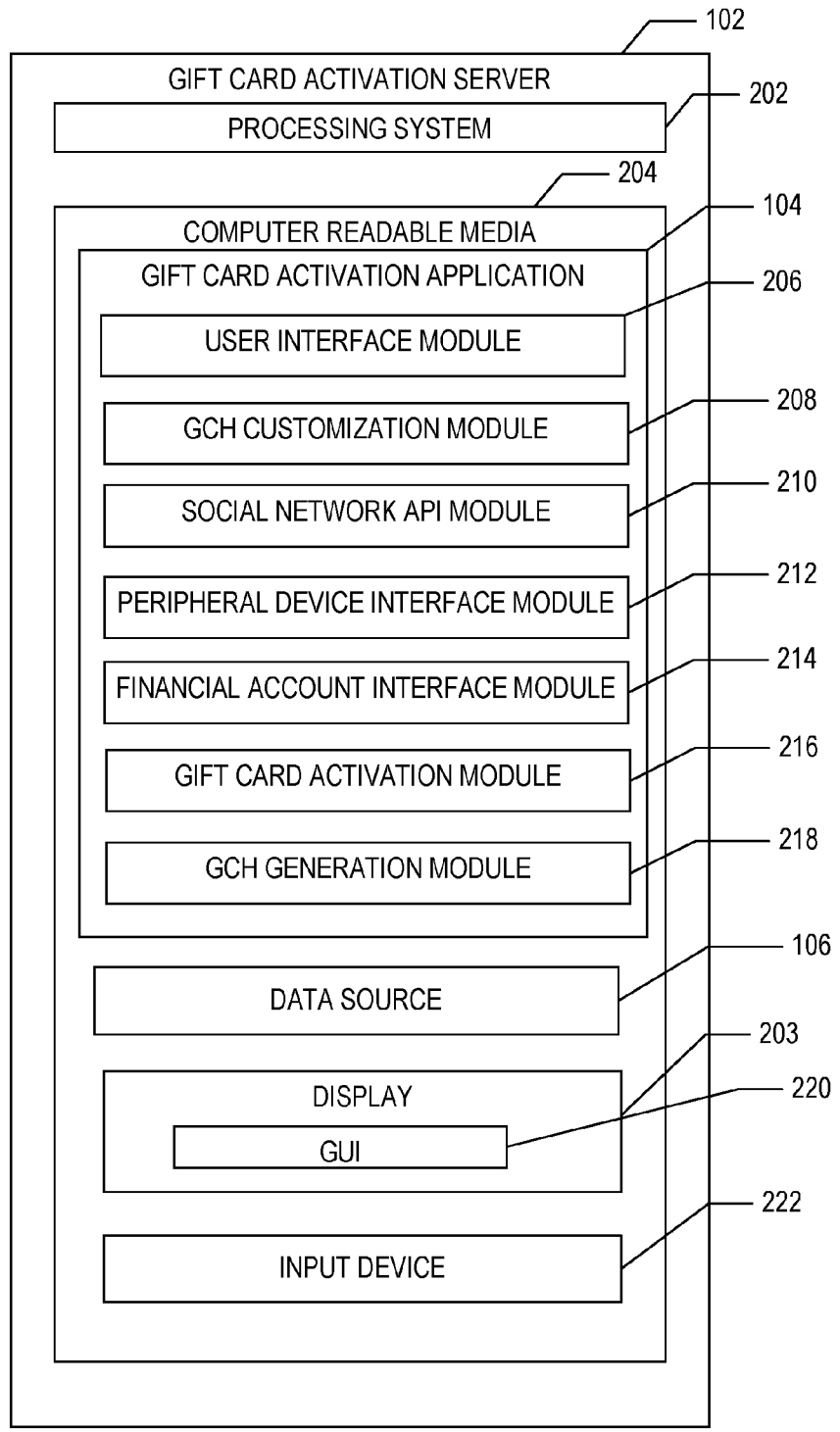
FIG. 2 is a block diagram of a computing system that includes a gift card ordering system according to an aspect of the gift card ordering system.

FIG. 2 is a block diagram depicting an example gift card ordering application 104 executed on the gift card ordering server 102. According to one aspect, the gift card ordering server 102 includes a processing system 202 that includes one or more processors or other processing devices. A processor is hardware. The processing system 202 executes the gift card ordering application 104 to generate the GUI 148 on the computing device 108 for receiving customized information from the user and generating a personalized gift card holder that is combined with a gift card to be sent to a recipient. According to another aspect, the gift card ordering server 102 also includes a display 203, such as a computer monitor, for displaying data and/or a graphical user interface 220. The gift card activation server 202 also includes an input device 222, such as a keyboard or a pointing device (e.g., a mouse, trackball, pen, or touch screen) to enter data into or interact with the graphical user interface 220.

According to one aspect, the gift card ordering server 102 includes a computer readable medium 204 configured with the gift card ordering application 104. The gift card ordering application 104 includes instructions or modules that are executable by the processing system 202 to generate a customized gift card holder to be sent to a recipient along with a selected gift card.

The computer readable medium 204 includes volatile media, nonvolatile media, removable media, non-removable media, and/or another available medium that can be accessed by the gift card ordering server 102. By way of example and not limitation, computer readable medium 204 comprises computer storage media and communication media. Computer storage media includes non-transient storage memory, volatile media, nonvolatile media, removable media, and/or non-removable media implemented in a method or technology for storage of information, such as computer readable instructions, data structures, program modules, or other data. Communication media embodies computer readable instructions, data structures, program modules, or other data and include an information delivery media or system.

A user interface module 206 facilitates the receipt of data and/or other communications from the computing device 108 of the user. In one example, the user interface module 206 communicates with the computing device 108 using a web browser executed on the computing device 108 to provide one or more selectable fields, editing screens, and the like for receiving content and/or modifying pre-recorded content by the user (i.e., sender). In another example, the user interface module 206 communicates with the computing device 108 using application software (i.e., a mobile app) executed on a computing device 108, such as a wireless communication device or tablet computer, to provide one or more selectable fields, editing screens, and the like for receiving content and/or modifying pre-recorded content by the user (i.e., sender). In yet another example, the user interface module 206 communicates with one or more peripheral devices 156 of the computing device 108 to receive user-supplied content to be included on the gift card holder and/or the gift card.

A gift card holder customization module 208 receives personalized content from the computing system 108, and provides for the customization of content, such as content received from the user interface module 206. For example, the gift card holder customization module 208 receives personalized content generated by the user and processes the received user-supplied content to generate customized content to be included in the gift card holder. For another example, the gift card holder customization module 208 receives user selection of a holder type including a particular design associated with a special occasion, which is, for example, a birthday, wedding, or a holiday, such as Christmas, Easter, Thanksgiving, and the like.

The user-supplied content also includes, for example, content stored in the data source 106, such as pre-recorded text information from pre-recorded text files 130, pre-recorded audio information from pre-recorded audio files 134, pre-recorded image information from pre-recorded image files 138, pre-recorded video information from pre-recorded video files 136, and/or a gift card to be included with the gift card holder that is further manipulated by the user via the GUI 148. In a particular embodiment, the user-supplied content includes pre-recorded content including a song or a portion of a pre-recorded song that is copyrighted and licensed by the owner of the copyrighted song. The gift card holder customization module 208 modifies existing content, such as pre-recorded content or other previously received content, based upon input received from the computing system 108. An example of modifying existing content includes modifying a received photograph using one or more photograph editing features that provides for cropping, color hue adjustment, brightness adjustment, sizing, and/or other features associated with manipulation of digital imagery.

A social network API module 210 provides an interface to one or more social network web sites to provide additional information for customizing a gift card holder. For example, the social network API module 210 accesses the API of a social media outlet to obtain personalized information associated with one or more recipients to aid in customizing the gift card holder. For a particular example using a FACEBOOK™ social network, the social network API module 210 identifies all friends having a birthday this month and send gift card/gift card holder combinations to each friend. For another particular example using the FACEBOOK™ social network, the social network API module 210 obtains from the social network server 124, personal information associated with the recipient and provide this information to the user in order to allow the user to select an appropriate gift card.

A peripheral device interface module 212 provides an interface to one or more peripheral devices of the computing device, such as a global positioning system (GPS) device, a camera, a microphone, and other device configured on the computing system 108. For example, the peripheral interface module 212 uses location information associated with a GPS device to aid in selecting pertinent gift card design (e.g., when vacationing at Grand Canyon, the gift card ordering application 104 uses the peripheral device interface module 212 to select imagery of canyon to include as the design of the holder). For another example, the peripheral device interface module 212 receives audio, still imagery, and/or video content using the microphone and/or camera configured on the computing device 108.

A user financial account API module 214 communicates with a payment processing server, such as the financial account server 122, to transact a monetary transfer of funds from the user's financial account to a financial account of a merchant of the gift card. In one example, the user financial account API module 214 includes an application program interface (API) for coordinating a monetary transaction (e.g., online money transfer) through an e-commerce provider, such as PAYPAL™, online credit card systems, or other suitable third party financial clearing entity. In another example, the user financial account API module 214 encodes monetary transaction information provided by the user and transmits this information to the gift card activation server 120 such that the gift card activation server 120 may communicate with the financial account server 122 of the user for transacting funds necessary for activating the gift card.

The gift card activation API module 216 communicates with the gift card activation server 120 for activation of the gift card. For example, the gift card activation server 120 is a server managed by a merchant associated with the gift card. For another example, the gift card activation server 120 is a third party server of a third party gift card activation service for activation of the gift card, such as SVS™, STORE FINANCIAL™, and the like.

A gift card holder (GCH) generation module 218 facilitates the generation of the gift card holder to be sent to the recipient along with the selected gift card. In one example, the gift card/gift card holder combination is generated in digital form and transmitted to the recipient via any suitable communication mechanism, such as via an e-mail message, or a short message service (SMS) message. In another example, information associated with the gift card/gift card holder combination is transmitted to a production facility 116 for generating a physical gift card holder, from which a gift card is inserted and sent to the recipient via a mail delivery service, such as the UNITED PARCEL SERVICE™ (UPS).

It should be appreciated that the modules described herein is provided only as an example of a computing device that executes the gift card ordering application 104 according to the teachings of the present invention, and that other computing systems may have the same modules, different modules, additional modules, or fewer modules than those described herein. For example, one or more modules as described in FIG. 2 is combined into a single module. As another example, certain modules described herein is encoded on, and executed on other computing systems, such as the computing device 108 used by the user.

Figure 3:
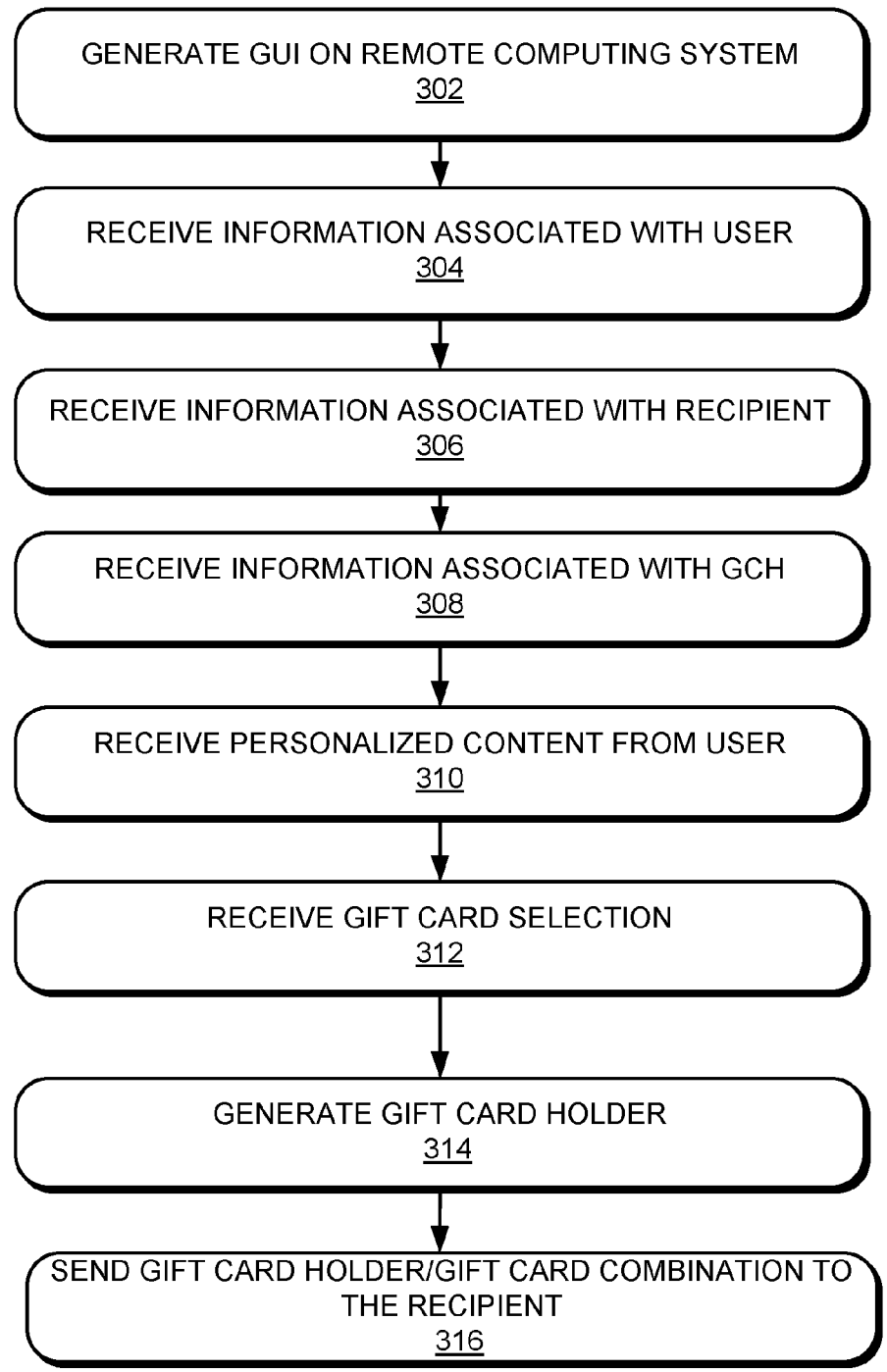
FIG. 3 is a flowchart depicting a process for creating a personalized gift card holder according to an aspect of the gift card ordering system.
Figure 12:
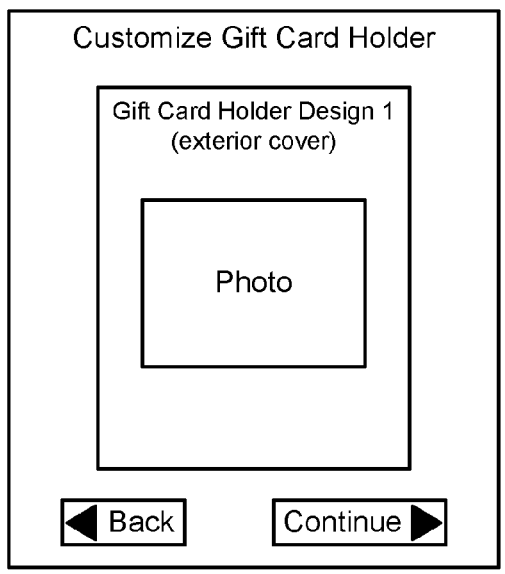
FIG. 12 illustrates an example of a holder customization page of a user interface according to an aspect of the gift card ordering system.
Figure 13:
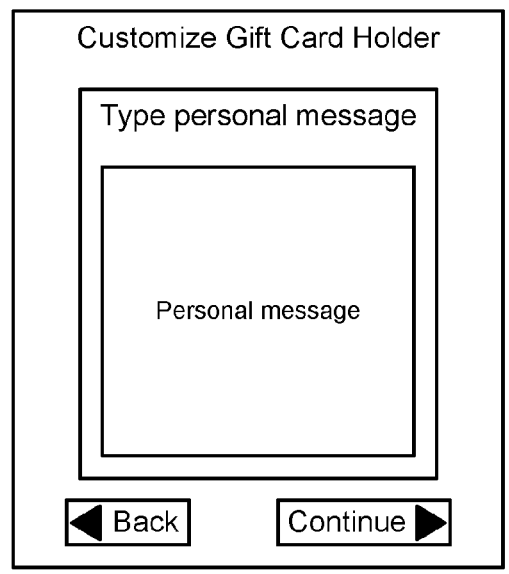
FIG. 13 illustrates an example of a holder customization page of a user interface according to an aspect of the gift card ordering system.
Figure 14:
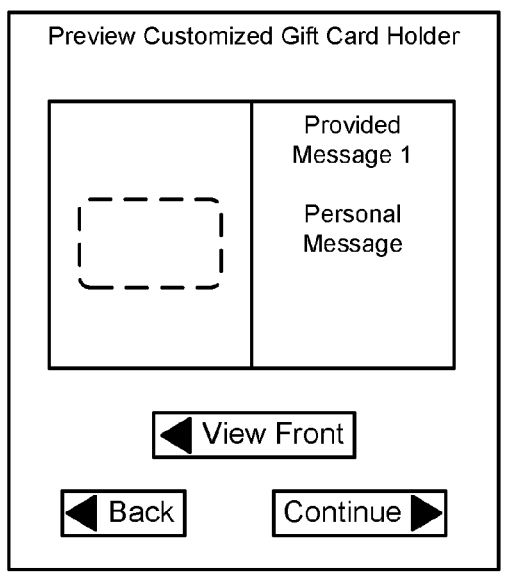
FIG. 14 illustrates an example of a holder preview page of a user interface according to an aspect of the gift card ordering system.
Figure 15:
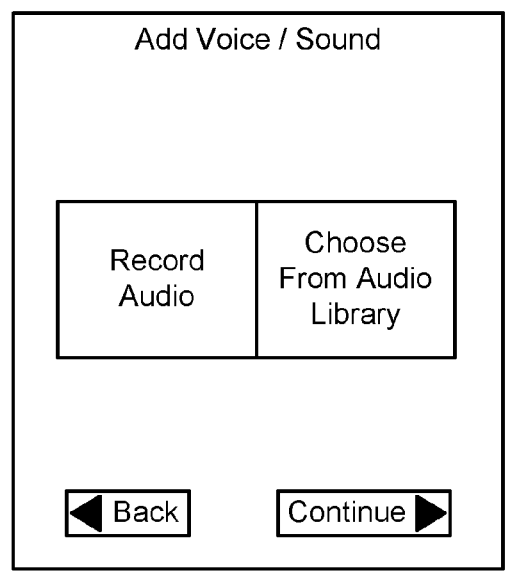
FIG. 15 illustrates an example of an audio selection page of a user interface according to an aspect of the gift card ordering system.
Figure 16:
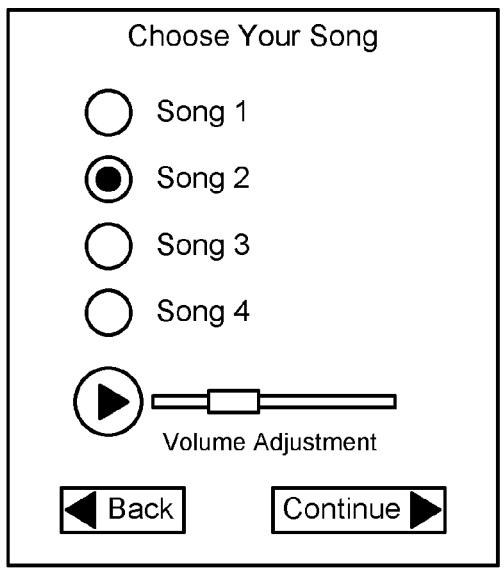
FIG. 16 illustrates an example of a song selection page of a user interface according to an aspect of the gift card ordering system.
Figure 17:
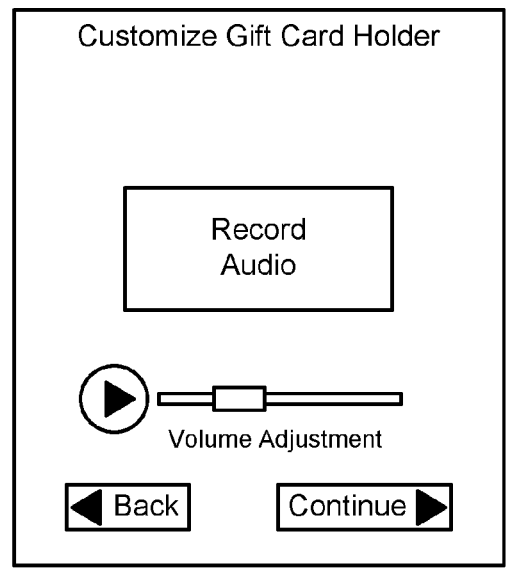
FIG. 17 illustrates an example of an audio record page of a user interface according to an aspect of the gift card ordering system.

FIG. 3 illustrates an example process that is performed by the gift card ordering application 104 according to the teachings of the present disclosure.

In step 302, the gift card ordering application 104 receives a request from a computing device 108 and generates a GUI on the computing system for receiving personalized information from the user. In one embodiment, the GUI is generated as a web page that is rendered by a web browser executed on the computing device 108 through a network, such as the Internet. In another embodiment, the GUI is generated by application software (i.e., a mobile app) designed to be executed on a computing device 108 embodied as a wireless communication device, a tablet computer, or other similar type of portable computing device.

The user accesses the system 100 via the computing device 108 via the user interface of the computing device 108 hosted by the gift card ordering server 102. A user may arrive at the system interface via an HTML link or other suitable entry point, such as through a mobile app executed on a portable computing device. The user typically initiates the online personalized gifting transaction by requesting a URL of the server 102 through a browser or by launching the mobile app on a portable computing device, such as a wireless communication device or portable tablet computer from which the GUI is generated on the computing device 108.

In some embodiments incorporating a mobile app that is executed on a portable computing device, a first or main screen display is provided showing elements such as text and graphics describing and explaining use of the system. The main screen also displays one or more banners showing seasonal offers provided to the user. In certain embodiments, the user can scroll through multiple banners using a finger swipe or other means, such as arrow keys, provided by the portable computing device for controlling and interacting with the mobile app executed on the portable computing device. Typically, the main screen also includes text and graphics comprising a primary navigation element, such as a "Get Started" button, that is activated by a screen touch or other selection means provided by the mobile device to advance the user to the next screen.

In step 304, the gift card ordering application 104 optionally receives information associated with the user. For example, the gift card ordering application 104 generates a splash screen (FIG. 4) on the computing device from which a sign-in screen (FIG. 5) is accessed by the computing device. In the event that the user has not yet established an account, the gift card ordering application 104 generates a registration screen (FIG. 6) on the computing device for registration of the user. In other embodiments, information associated with the user without the splash screen, sign-in screen, and registration screen as shown in FIGS. 4-6, respectively if registration of the user is not needed or desired. It is important to note that the screens of FIGS. 4-6 in addition to the screens of FIGS. 5-22 of the present disclosure may refer to screens generated by a mobile app on a computing device, such as smartphone as well as screens generated by a web browser on a computing device, such as a home computing system.

In step 306, the gift card ordering application 104 optionally receives information associated with a recipient. For example, the gift card ordering application 104 generates a recipient information screen (FIG. 7) to receive one or more identifying elements of the recipient from the user. The gift card ordering application 104 also generates a second recipient information screen (FIG. 8) to receive one or more other elements of information of the recipient, such as a location where the recipient resides, an age of the recipient, and any interests of the recipient. It is important to note that FIGS. 7 and 8 merely show one embodiment of recipient information that is received by the gift card ordering application 104; other examples however, provides for receipt of any type of recipient information. Alternatively, the gift card ordering application 104 obtains personal information of the recipient using one or more social network sites, such as FACEBOOK™. As will be described in detail below. The gift card ordering application 104 uses this information to provide targeted suggestions to the user for designing the gift card holder and/or selection of a gift card.

Certain embodiments of the system 100 provide a technique for a user to view and select social media contacts (e.g. FACEBOOK™ friends) via social media APIs that provide contact information and demographics that the system utilizes to provide gifting recommendations to the user. The system, for example, provides the user with a listing of all contact birthdays within a specified or system-determined period of time (e.g. 30 days), and allows the user to select a contact from the list and then proceed with creating a personalized gift via the system as described herein below.

In step 308, the gift card ordering application 104 receives gift card information from the computing device 108. For example, the gift card ordering application 104 presents an occasion screen (FIG. 9) for entry of a particular occasion by a user of the computing device 108. As another example, the gift card ordering application 104 presents a gift card holder selection screen (FIG. 10) for selection of a particular type of design to be placed on the gift card holder. For a particular example in which the selected occasion is Christmas, the gift card ordering application 104 presents multiple designs that alternatively include a Christmas tree, a manager scene, three wise men on a desert journey, and the like. The user, via the computing device 108, selects one particular design for further personalization.

The user selects the gift card information by searching for specific gift cards via occasion, category (e.g., dining, spa, hotel, shopping, or event), brand, and/or recipient (e.g., him, her, teens, kids, or babies) associated with gift cards. The user can also filter by geographic location, using city and state, street address, or zip code information. In some embodiments, the user can search for a specific gift card by accessing the system 100 via a device having GPS or other geographic locator capabilities in which the location is determined and transferred directly to the system via geographic data provided by the GPS device. In some embodiments, the gift card brand selection is made by initiating the transaction through a specific merchant website. The user then selects a gift card corresponding to a particular offer. Typically, an offer will comprise a particular business entity or venue and may be, for example, a restaurant, hotel, theater, store, or shopping district. In some embodiments, the user also selects particular design graphics or indicia to appear on the gift card. The user then selects a gift card denomination or enters a desired denomination amount to load or associate with the gift card. In certain embodiments the user searches by experience and thus select multiple brands available via a single gift card (e.g., dinner and a movie) or a gift card that is pre-denominated (i.e., a preset monetary value). Gift cards may also be pre-selected if the user accesses the system via a vendor website, in which case the vendor identity is provided by the vendor site to the system.

In step 310, the gift card ordering application 104 receives personalized content from the GUI (FIGS. 11-19). For example, the gift card ordering application 104 presents an interactive screen (FIG. 11) to receive selection of a photograph from either a social media website, from the phone on which the GUI is displayed, or from a camera configured on the phone. It should be understood herein that the gift card ordering application 104 uploads content from any suitable computing device 108 on which the GUI is displayed, such as a workstation, notebook computer, or tablet computer. As another example, the gift card ordering application 104 also displays the selected photograph on a portion of the gift card holder (FIG. 12) and provides for editing of the photograph using typical editing techniques such as cropping, color hue adjustment, and the like. As another example, the gift card ordering application 104 presents a personal message entry screen (FIG. 13) that allows for the entry of a text message by a user of the computing device 108. Once any photographs and/or text messages are received from the computing device 108, the gift card ordering application 104 displays a preview screen (FIG. 14) to show how the gift card holder will look.

Figure 18:
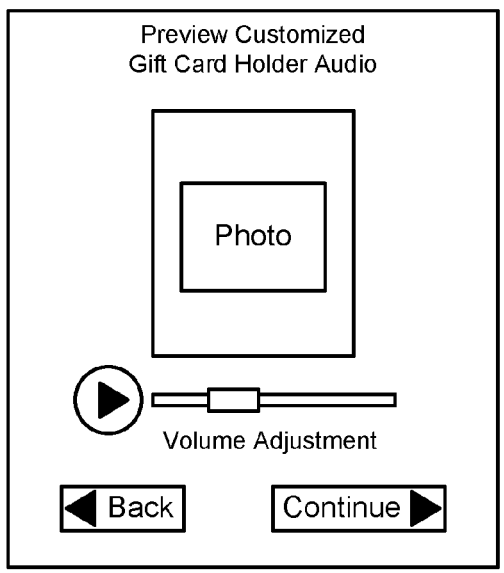
FIG. 18 illustrates an example of an audio preview page of a user interface according to an aspect of the gift card ordering system.
Figure 19:
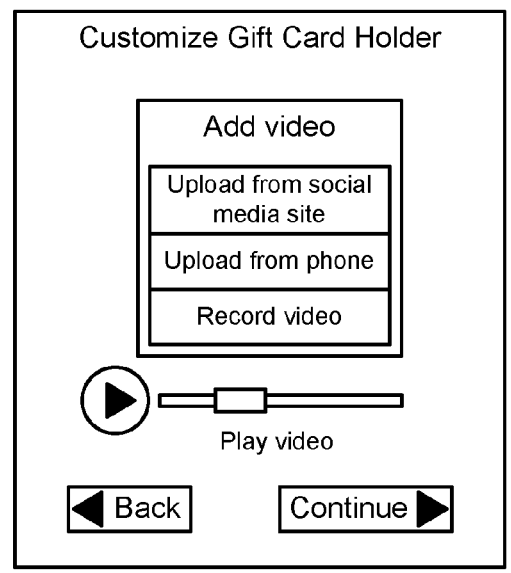
FIG. 19 illustrates an example of a video template selection page of a user interface according to an aspect of the gift card ordering system.
Figure 20:
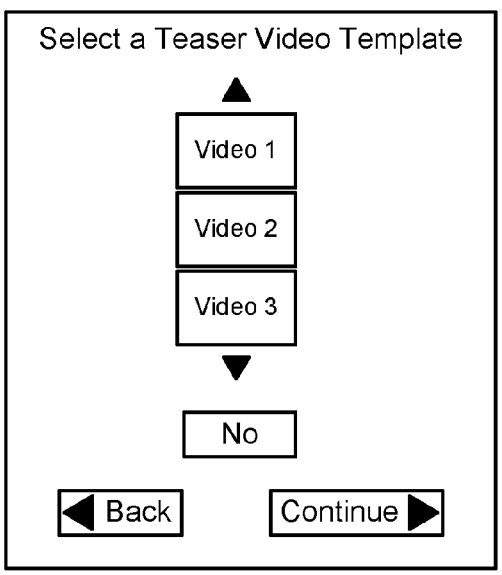
FIG. 20 illustrates an example of a video template selection page of a user interface according to an aspect of the gift card ordering system.

According to one embodiment, the gift card ordering application 104 provides for selection or creation of audio content for the gift card holder by the user. The gift card ordering application 104 presents an audio selection screen (FIG. 15) that allows the user to either select a pre-record audio segment or create an audio segment, such as an audio file stored in 'mp3' or 'way' format. If the gift card ordering application 104 receives selection of a pre-recorded audio segment, an audio selection screen (FIG. 16) is generated that allows for selection of a particular audio file by the user of the computing device 108. However, if the gift card ordering application 104 receives selection of an audio creation, an audio generation screen (FIG. 17) is generated to receive an audio segment from the computing device 108. In one embodiment, the GUI has access to the API associated with the microphone of the computing device 108 such that the audio segment is obtained directly from the microphone of the computing device 108. Although not shown, the gift card ordering application 104 also place or receive a plain old telephone service (POTS) phone call to receive audio content to be included with the gift card holder. Additionally, the gift card ordering application 104 can upload a previously recorded audio file from the computing device 108 for inclusion with the gift card holder. The gift card ordering application 104 displays a preview screen (FIG. 18) in which the selected audio segment is played along with any previously selected video and/or text content as shown in FIG. 18.

According to another embodiment, the gift card ordering application 104 provides for addition of video content for the gift card holder. The video content is included with the gift card holder or is sent separately to the recipient as a 'teaser video'.

To provide video content, the gift card ordering application 104 presents a video selection screen (FIG. 19) that allows the user to either upload a video segment from a social media website, upload an existing, previously recorded video segment, or record a video segment. If a teaser video is to be implemented, the gift card ordering application 104 presents a teaser video template screen (FIG. 20) that provides template for the recorded video. Each template includes a structure, such as the recording time, screen density, and any textual or graphic embellishments that is displayed along with the teaser video segment.

In one embodiment, the teaser video includes a template-based FLASH™ video file having predetermined content structures (e.g., placement areas) that are marked and tracked within the video file. Uploaded content (e.g. text, audio, image, or video segments) are mapped within the content structures in the video file. Once content is uploaded and mapped to the content structures, the gift card ordering application 104 displays a preview of the teaser video through a suitable video player. The application 104 then saves the video as a teaser video (e.g. Flash video file) that is set for streaming from a video management system, such as the retailer video message management module 220 via a suitable content delivery network (e.g. Rackspace or Akamai CDN).

In one embodiment, the teaser video may be composited using any mechanism, which may include a system specific custom compositing engine based on Open Source Media Framework Template Flash video files provided by ADOBE™. The video may be viewed using any mechanism, such as a system specific, custom video player based on the Open Source Media Framework. The gift card ordering application 104 includes a Rackspace Content Delivery Network server for storing the uploaded user images and a video server for storage and streaming of the teaser videos. Additionally, via SWF to MP4 Conversion Tools, the gift card ordering application 104 encodes the teaser videos into an MP4 format for optional playback on mobile devices. In certain embodiments, the gift card ordering application 104 encodes the teaser video in HTML5 format to play audio and video within webpages and, for example, to construct and play videos provided by the system. In one embodiment, the GUI has access to the API associated with the camera of the computing device 108 such that the video segment is obtained directly from the camera of the computing device 108.

Figure 21:
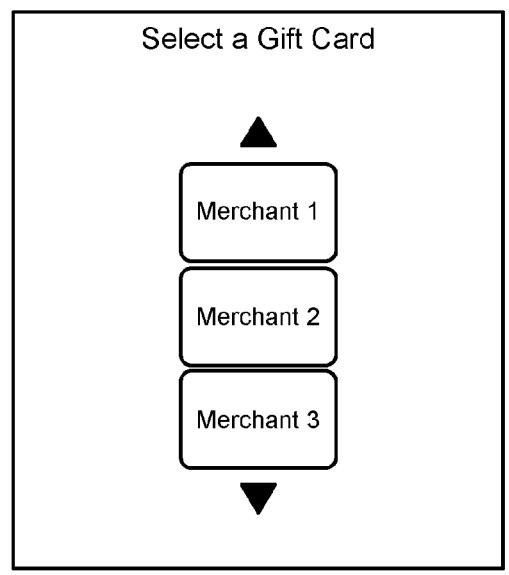
FIG. 21 illustrates an example of a gift card merchant selection page of a user interface according to an aspect of the gift card ordering system.
Figure 22:
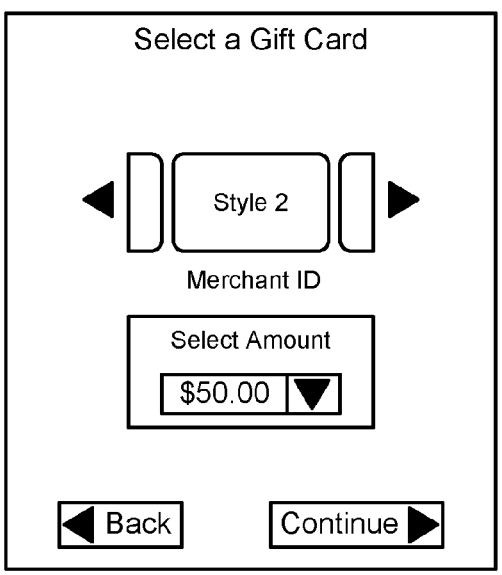
FIG. 22 illustrates an example of a gift card style selection page of a user interface according to an aspect of the gift card ordering system.

In step 312, the gift card ordering application 104 receives selection of a gift card to accompany the gift card holder designed and personalized in steps 302 through 310. For example, the gift card ordering application 104 generates a gift card selection screen (FIG. 21) that allows the user to select one or more gift cards to accompany the personalized gift card holder. In one embodiment, the gift card ordering application 104 uses personal information obtained from one or more social media outlets to generate a suggested list of merchants from which to choose. For example, if personal information associated with the recipient indicates that the recipient enjoys automobile racing, the gift card ordering application 104 aggregates gift card offerings from merchants that provide racing equipment or other automobile equipment, such as aftermarket automobile parts, automobile service centers, and the like. Once the merchant type is selected as shown in FIG. 21, the gift card ordering application 104 presents a gift card customization screen (FIG. 22) that allows the user to enter a particular style and a monetary amount for the gift card. The style of the gift card includes one of multiple background images that are to be displayed on the card.

Certain embodiments of the system provide a mechanism to use the system 100 for charitable giving by providing an option for the user to select a gift card as a means for a charitable donation. The recipient receives the card, selects a charity, and the selected charity receives a donation per the value of the card. The system of the present invention is used to provide enhancements to the charitable gifting experience, both for the user and the recipient, such as by means of personalized gift card holders including graphic, text, audio and/or video content, and by sending the recipient a video teaser in advance of receipt of the gift card.

In step 314, the gift card ordering application 104 generates a gift card holder in accordance with information provided by the user of the computing device in steps 302 through 310. In one embodiment, the gift card ordering application 104 generates a gift card holder/gift card combination in digital form. In another embodiment, the gift card ordering application 104 sends information associated with the gift card holder/gift card combination to a production facility for generating the gift card holder/gift card combination in physical form. That is, the gift card ordering application 104 transmits the information associated with the gift card holder/gift card combination to a production facility whereby a gift card holder (FIG. 23 or 24) is fabricated using conventional printing techniques on a physical medium, such a paper cardstock, plastic sheet, parchment, or other suitable print media.

In step 316, the gift card ordering application 104 sends the gift card holder/gift card combination to the recipient. For the embodiment above in which the gift card holder/gift card combination is generated in digital form, the application 104 transmits the gift card holder/gift card combination to the user via any suitable digital format, such as via an e-mail message, via a short message service (SMS) message, or via a social media account. However, for the embodiment above in which the gift card holder/gift card combination is generated in physical form by the production facility, the gift card holder/gift card combination is sent to the recipient via a mail delivery service.

The process described above is performed repeatedly for additional gift card holder/gift cards to be sent to one or more recipients. When use of the gift card ordering application 104 is no longer needed or desired, the process ends.

It should be appreciated that the steps described herein is provided only as an example of a process that is performed by the gift card ordering application 104 according to the teachings of the present invention, and that the gift card ordering application 104 may perform fewer, more, or different types of steps than those described herein. For example, the gift card ordering application 104 performs multiple steps described above as a single step. As another example, certain steps described herein is performed by other components of the gift card ordering system 100, such as by the computing device 108 used by the user.

Figure 23:
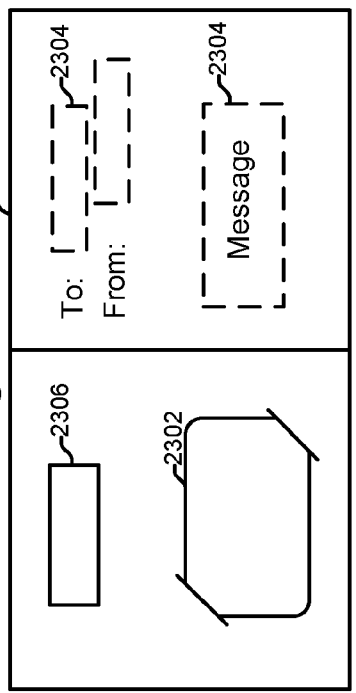
FIGS. 23 and 24 illustrate example gift card holder/gift card combinations that is generated by the gift card ordering system according to an aspect of the present disclosure.
Figure 24:
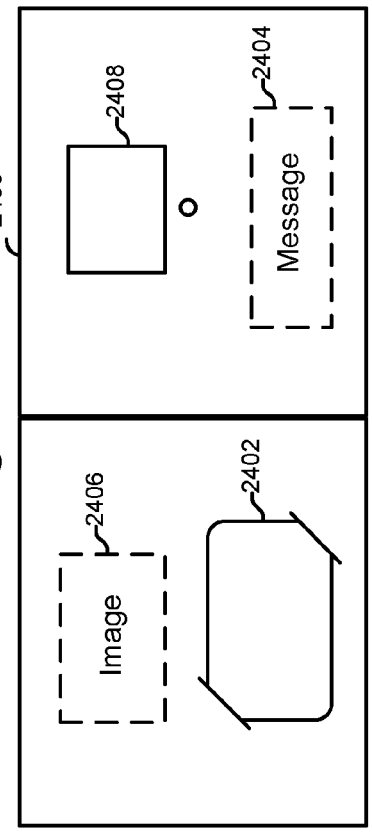

FIGS. 23 and 24 illustrate example gift card holder/gift card combinations that is generated by the gift card ordering system 100 according to embodiments of the present disclosure.

As shown in FIG. 23, the gift card holder 2300 includes a gift card 2302 and one or more customized text messages 2304 indicating whom the holder is from, whom the holder is addressed to, or other messages to be conveyed to the recipient. The fabricated gift card holder 2300 also includes a memory device 2306 for storage of imagery, audio files, and/or video files as described above, such that, upon receipt by the recipient, he or she may view imagery or play the audio/video files on a suitable playback device, such as a personal computer.

As shown in FIG. 24, the gift card holder 2400 includes a gift card 2402 and a customized message 2404 that is printed on the holder 2400. The gift card holder 2400 also include a customized image 2406 to be printed on the holder 2400, and a video/audio playback device 2408 that provides audio and video playback capability for any customized video/audio files. The video playback device 2408 includes a memory for storage of a video and audio files, and a display, such as a liquid crystal display (LCD) for playing the video file along with a speaker or other sound generation device for playing the audio file.

FIGS. 23 and 24 merely show two examples of physical gift card holder/gift card combinations that is provided by the gift card ordering application 104, other examples includes different combinations of components. For example, the gift card holder 2400 of FIG. 24 includes only a video playback device or may alternatively include only an audio playback device. Additionally, the customized messages, gift card, audio/video playback device, or images is arranged on the gift card holder in any suitable manner and in any suitable orientation with respect to one another.

Figure 25A:
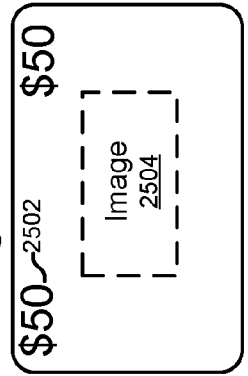
FIGS. 25A through 25C illustrate several example gift cards that is used with the gift card ordering system according to an aspect of the present disclosure.
Figure 25B:
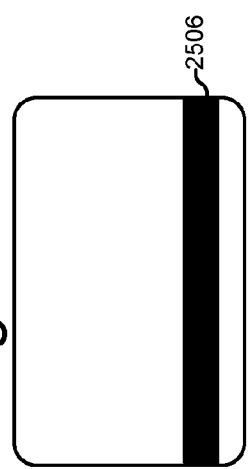
Figure 25C:
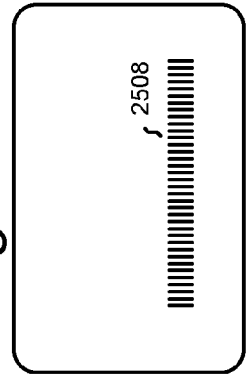

FIGS. 25A through 25C illustrate several embodiments of example gift cards that is used with the gift card ordering system 100. The gift cards generally include pieces of planar-shaped card stock formed from inexpensive material, such as plastic having a front surface, such as shown in FIG. 25A, and a rear surface, such as shown in FIG. 25B or 25C. The front surface includes indicia indicating a monetary amount 2502 and optionally includes an image 2504 that is associated with a merchant that issued the gift card. The rear surface includes a computer readable medium, such as a magnetic strip 2506 as shown in FIG. 25B or a barcode 2508 as shown in FIG. 25C.

It should be understood that the gift cards described herein above merely represent example gift cards that is used with the present disclosure, and that other types or styles of gift cards is used. For example, the gift card is a form printed on a conventional 8.5 inch by 11 inch sheet of paper that includes indicia indicating such information as the merchant and the monetary amount allocated to that gift card.

Those skilled in the art will appreciate that variations from the specific embodiments disclosed above are contemplated by the invention. The invention should not be restricted to the above embodiments, but should be measured by the following claims.

What is claimed is:

1. A method of creating a personalized stored value card and accompanying presentation, the method comprising the steps of:
   generating, on a customer computing device, a graphical user interface programmed to: receive, from the customer, a selection of a merchant of a stored value card and a monetary amount to be associated with the stored value card;
   receive, at a server from the customer, customer-generated content, the customer-generated content generated using an input device of the customer computing device; and
   receive, at the server from the customer, a selection of a recipient for the stored value card and the accompanying presentation;
   generating a stored value card presentation from the received customer-supplied content;
   generating geographic location content based at least in part on a geographic location of the customer computing device;
   generating the accompanying presentation by compositing the customer-generated content and the geographic location content into a presentation template;
   transmitting from the server the accompanying presentation to the recipient in a first communication; and
   delivering from the server the stored value card in a subsequent second communication.

2. The method of claim 1, wherein the customer computing device is a smartphone and the input device of the customer computing device is camera.

3. The method of claim 1, wherein the customer computing device is a personal computing device and the graphical user interface is presented in a browser of the personal computing device.

4. The method of claim 1, wherein the customer-supplied content includes at least one of customer-supplied textual, audio, image, pre-recorded video and customer-recorded video content.

5. The method of claim 1, wherein the accompanying presentation is transmitted via a social media account of the recipient.

6. The method of claim 1, wherein the GUI is further programmed to suggest, to the customer and based on a social media account of the recipient, a merchant for the stored value card.

7. The method of claim 1, wherein the stored value card presentation is a digital stored value card presentation and the stored value card comprises a digital stored value card.

8. One or more non-transitory computer-readable media storing computer-executable instructions that, when executed, direct a server to perform a method of creating a personalized stored value card and accompanying presentation, the method comprising the steps of:
generating, on a customer computing device, a graphical user interface programmed to:
receive, from the customer, a selection of a merchant of a stored value card and a monetary amount to be associated with the stored value card;
receive, from the customer, customer-generated content, the customer-generated content generated using an input device of the customer computing device; and
receive, from the customer, a selection of a recipient for the stored value card and the accompanying presentation;
generating a stored value card presentation from the received user-supplied content;
generating geographic location content based at least in part on a geographic location obtained from the customer computing device;
generating the accompanying presentation by compositing the customer-generated content and the geographic location content into a presentation template, the presentation template including one or more items of pregenerated content;
transmitting the accompanying presentation to the recipient in a first communication from the server; and
delivering the stored value card in a subsequent second communication from the server.

9. The media of claim 8, wherein the customer computing device is a smartphone and the input device is a microphone of the smartphone.

10. The media of claim 8, wherein the customer computing device is a personal computing device and the input device is a keyboard of the personal computing device.

11. The media of claim 8, wherein the stored value card presentation is a physical gift card presentation and is delivered via a mail delivery service.

12. The media of claim 8, wherein the accompanying presentation is transmitted via SMS to the recipient.

13. A system for creating a personalized stored value card and accompanying presentation, comprising:
a server; and
a client computing device, programmed to generate a graphical user interface configured to:
receive, from the customer, a selection of a merchant of a stored value card and a monetary amount to be associated with the stored value card;
receive, from the customer, customer-generated content, the customer-generated content generated using an input device of the customer computing device;
receive, from a customer computing device, a location of the customer computing device; and
receive, from the customer, a selection of a recipient for the stored value card and the accompanying presentation,
wherein the server is programmed to:
cause the client computing device to generate the graphical user interface;
receive, from the client computing device, the indication of the merchant, the monetary amount, the customer-generated content, and the indication of the recipient;
generate a stored value card presentation from the received customer-supplied content;
generate geographic location content based at least in part on the location of the customer computing device;
generate the accompanying presentation by compositing the customer-generated content and the geographic location content into a presentation template, the presentation template including one or more items of pregenerated content;
transmit the accompanying presentation to the recipient in a first communication from the server; and
communicate with a stored value card activation server to provide customer payment information to activate the stored value card, and provide the stored value card to the customer in a second communication from the server.

14. The system of claim 13, wherein the server causes the client computing device to generate the graphical user interface by transmitting a web page to a browser on the client computing device.

15. The system of claim 13, wherein the pregenerated content includes graphics to be displayed along with the customer-generated content.

16. The system of claim 13, wherein the server is further programmed to communicate with a stored value card activation server to provide customer payment information to activate the stored value card.

17. The system of claim 13, wherein the customer computing device is a smartphone and the graphical user interface is displayed in an app on the smartphone.

18. The system of claim 13, wherein the graphical user interface is further configured to receive, from the customer, an indication of an occasion for the stored value card.

* * * * *